(12) United States Patent
Wyatt

(10) Patent No.: US 11,833,943 B2
(45) Date of Patent: Dec. 5, 2023

(54) MOLDED PANEL ASSEMBLY HAVING MULTIPLE SEWING ALIGNMENT FEATURES

(71) Applicants: Daniel Wyatt, St. Claire Shores, MI (US); Magna Seating Inc., Aurora (CA)

(72) Inventor: Daniel Wyatt, St. Claire Shores, MI (US)

(73) Assignee: Magna Seating Inc., Aurora (CA)

(*) Notice: Subject to any disclaimer, the term of this patent is extended or adjusted under 35 U.S.C. 154(b) by 0 days.

(21) Appl. No.: 17/791,978

(22) PCT Filed: Jan. 11, 2021

(86) PCT No.: PCT/US2021/012887
§ 371 (c)(1),
(2) Date: Jul. 11, 2022

(87) PCT Pub. No.: WO2021/142407
PCT Pub. Date: Jul. 15, 2021

(65) Prior Publication Data
US 2023/0047196 A1 Feb. 16, 2023

Related U.S. Application Data

(60) Provisional application No. 62/959,225, filed on Jan. 10, 2020.

(51) Int. Cl.
  *B60R 13/02* (2006.01)
  *B60N 2/58* (2006.01)
  *B60N 2/70* (2006.01)

(52) U.S. Cl.
  CPC ......... *B60N 2/5883* (2013.01); *B60N 2/5891* (2013.01)

(58) Field of Classification Search
  CPC ... B60N 2/5891; B60N 2/5883; B60N 2/7017
  See application file for complete search history.

(56) References Cited

U.S. PATENT DOCUMENTS 4,722,760 A * 2/1988 Shimada ............... B32B 27/304
                                                 428/167
9,168,854 B2 * 10/2015 Ursino ................. B60N 2/7094
(Continued)

FOREIGN PATENT DOCUMENTS

CN  202115389  1/2012
CN  107107797  8/2017
(Continued)

*Primary Examiner* — Shin H Kim
(74) *Attorney, Agent, or Firm* — Miller Canfield

(57) ABSTRACT

A seat trim cover for a vehicle seat comprises a molded foam backing formed on a cover material blank that has been vacuum-formed into a 3-dimensional shape. The cover material blank has been pre-cut into a predefined shape having a predefined selvage extending around an outer periphery of the cover material blank. The molded foam backing is spaced apart from the predefined selvage of the cover material blank forming a foam-free selvage. The molded foam backing includes a stepped edge profile having a first surface defining a first sewing alignment feature and a second surface defining a second alignment feature. The first sewing alignment feature is spaced apart from the second sewing alignment feature.

17 Claims, 19 Drawing Sheets

(56) References Cited

U.S. PATENT DOCUMENTS

| | | |
|---|---|---|
| 9,290,119 B2 | 3/2016 | Tabata |
| 10,259,361 B2 | 4/2019 | Bourde et al. |
| 10,577,735 B2 | 3/2020 | Honma et al. |
| 11,427,117 B2 * | 8/2022 | Kozlowski .............. B32B 5/142 |
| 2005/0103247 A1 | 5/2005 | Hori |
| 2013/0118679 A1 * | 5/2013 | Hofmair ............. B32B 37/1018 156/245 |
| 2021/0086670 A1 * | 3/2021 | Kozlowski ............ B32B 27/304 |
| 2022/0017003 A1 * | 1/2022 | Carraro ................... B32B 5/245 |
| 2023/0047196 A1 * | 2/2023 | Wyatt ................. B60N 2/5883 |

FOREIGN PATENT DOCUMENTS

| | | |
|---|---|---|
| JP | 2016120087 | 7/2016 |
| WO | 2019232538 | 12/2019 |

\* cited by examiner

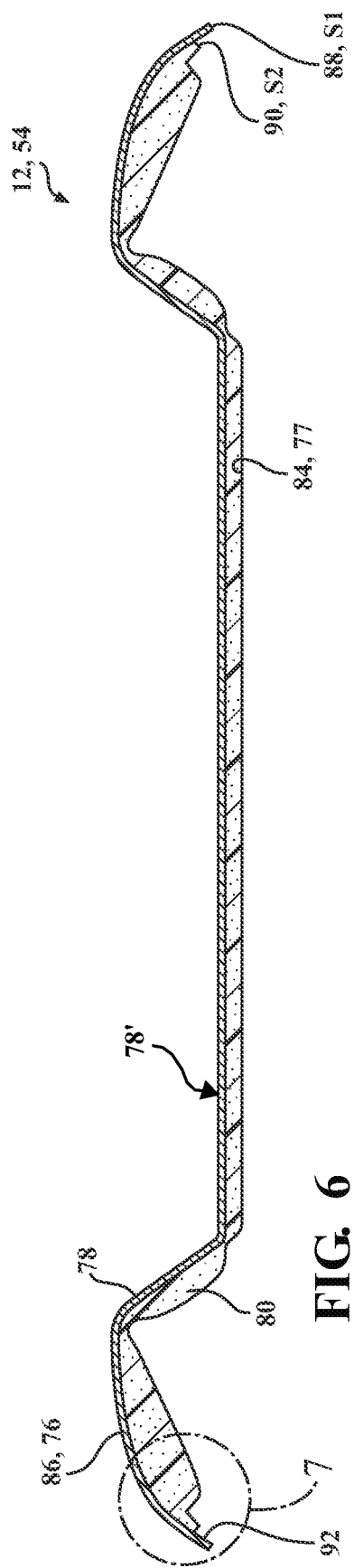
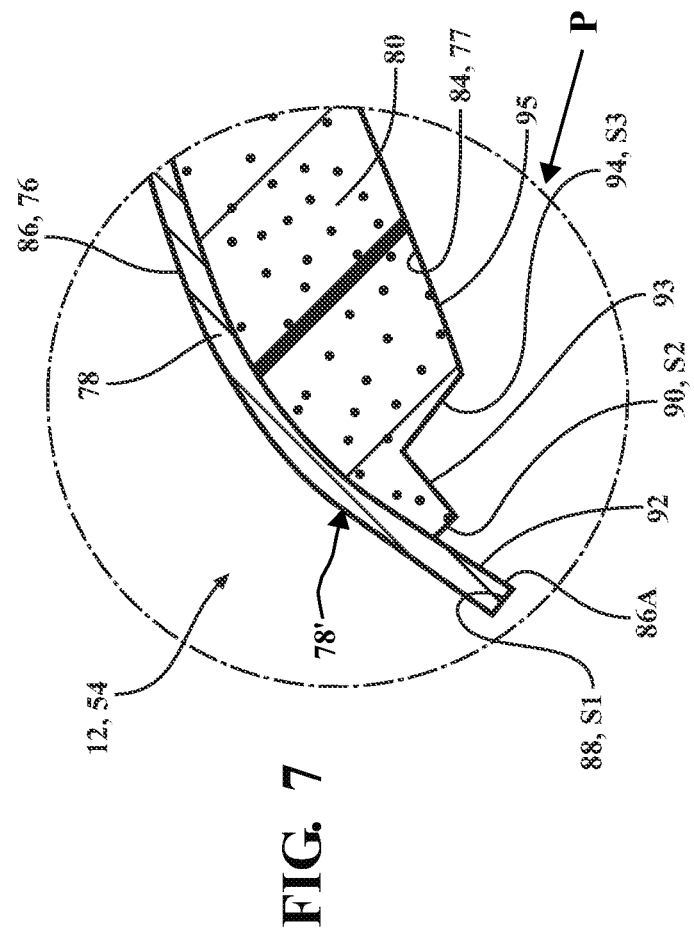

MOLDED PANEL ASSEMBLY HAVING MULTIPLE SEWING ALIGNMENT FEATURES

CROSS-REFERENCE TO RELATED APPLICATIONS

This application claims priority to U.S. Provisional Application 62/959,225, filed on Jan. 10, 2020, the disclosure of which is incorporated by reference in its entirety.

BACKGROUND OF THE INVENTION

1. Field of the Invention

The present invention relates to a process for molding cover materials and the cover materials formed using this molding process. More particularly, the invention relates to a process for forming 3-dimensional cover materials and to an automotive seat trim cover formed by the molding process and having multiple sewing alignment features integrated within the seat trim cover.

2. Description of Related Art

Automotive vehicles typically include one or more seat assemblies having a seat cushion and a seat back for supporting a passenger above a vehicle floor. Generally, each of the seat cushion and seat back comprise a foam pad supported by a frame. A cover is assembled with the foam pad to provide a finished surface. Each of the seat cushion and seat back generally have one or more contoured surfaces and generally require a contoured cover. The contoured cover generally comprises a seating surface portion (referred to hereafter as a trim cover panel or trim cover) fastened and/or sewn to one or more side pieces.

One known method for forming 3-dimensional automotive seat trim covers is a process wherein a laminate blank comprising a cover material layer and a foam interlayer is compression-molded to form the seat trim cover, as is disclosed in related PCT Publication No. WO2019/232538. The foam interlayer around the outer perimeter of the seat trim cover is highly compressed resulting in a stiff selvage for joining the compression molded trim cover to another component. The selvage is thicker and stiffer than the cover material layer, increasing the difficulty in forming a sew seam between the molded trim cover and another component.

It is desirable, therefore, to form an automotive seat trim cover having a 3-dimensional shape, an integrated foam backing, and a flexible selvage. Further, it is desirable to minimize the amount of material within a sew seam between the trim cover and a second component. In addition, it is desirable to include a portion of the foam backing into the sew seam. Also, it is desirable to improve the appearance of the sew seam. Furthermore, it is desirable to reduce errors when sewing a sew seam between the trim cover and a second component.

SUMMARY OF THE INVENTION

A seat trim cover for a vehicle seat comprises a molded foam backing formed on a cover material blank that has been vacuum-formed into a 3-dimensional shape. The cover material blank has been pre-cut into a predefined shape having a predefined selvage extending around an outer periphery of the cover material blank. The molded foam backing is spaced apart from the predefined selvage of the cover material blank forming a foam-free selvage. The molded foam backing includes a stepped edge profile having a first surface defining a first sewing alignment feature and a second surface defining a second alignment feature. The first sewing alignment feature is spaced apart from the second sewing alignment feature.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 illustrates a cross-sectional view of the molded trim cover of FIG. 4 taken along section line 6-6 shown in FIG. 4;

FIG. 7 shows an enlarged cross-sectional view of portion 7 of the molded trim cover of FIG. 6;

DETAILED DESCRIPTION OF THE EMBODIMENTS

FIGS. 1-19 and 24-27 illustrate molded vehicle seat trim covers and/or trim components, vehicle seats having molded trim covers and/or trim components, processes for manufacturing the seat trim covers and/or trim components, and sewing methods for joining trim covers and/or trim components according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, the Figures are not necessarily shown to scale. Referring to the Figures, like numerals indicate like or corresponding parts throughout the several views.

Figure 1:
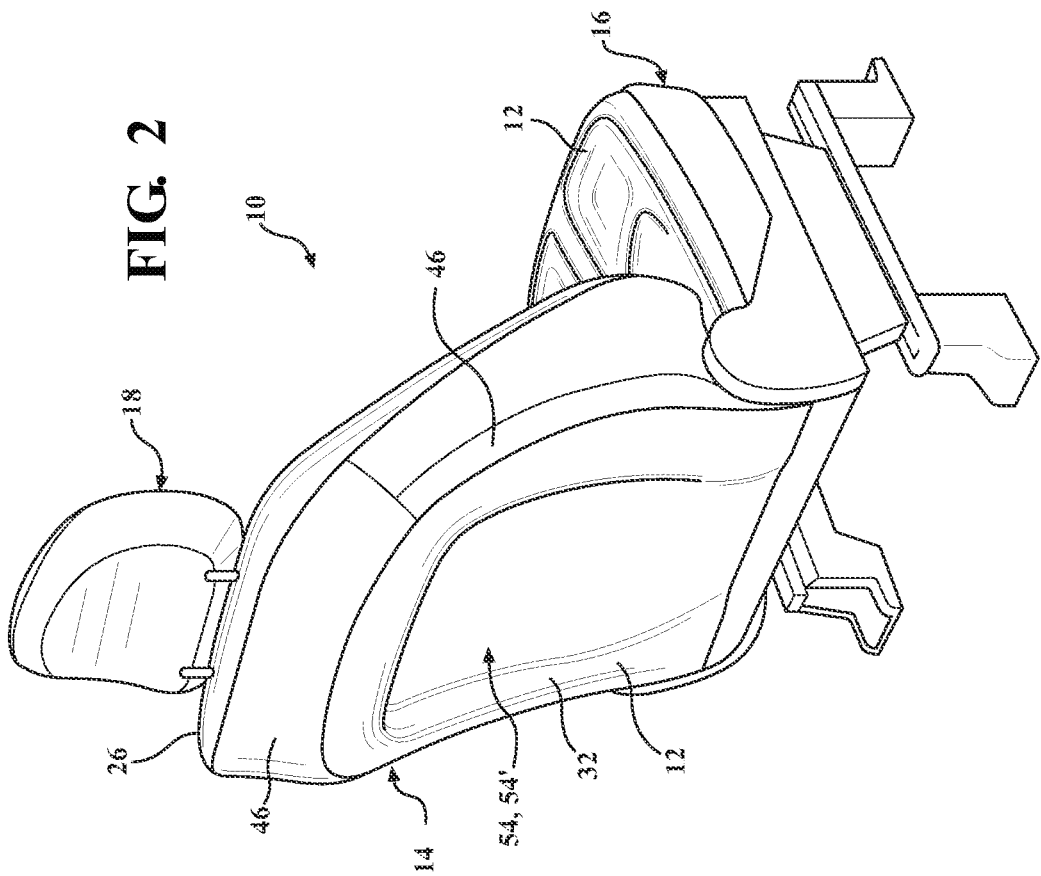
FIG. 1 illustrates a front perspective view of a vehicle seat having a molded seat back trim cover and a molded seat cushion trim cover, according to an embodiment of the present invention.
Figure 2:
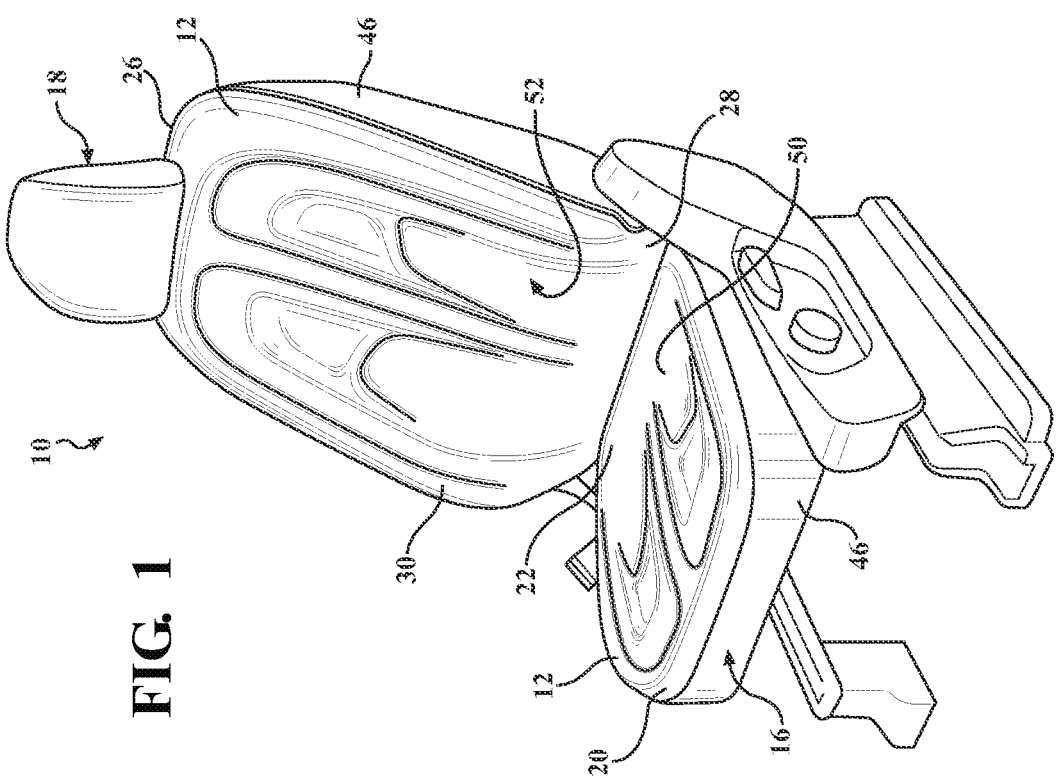
FIG. 2 illustrates a rear perspective view of the vehicle seat of FIG. 1 having a molded back panel trim cover, according to an embodiment of the present invention.
Figure 3:
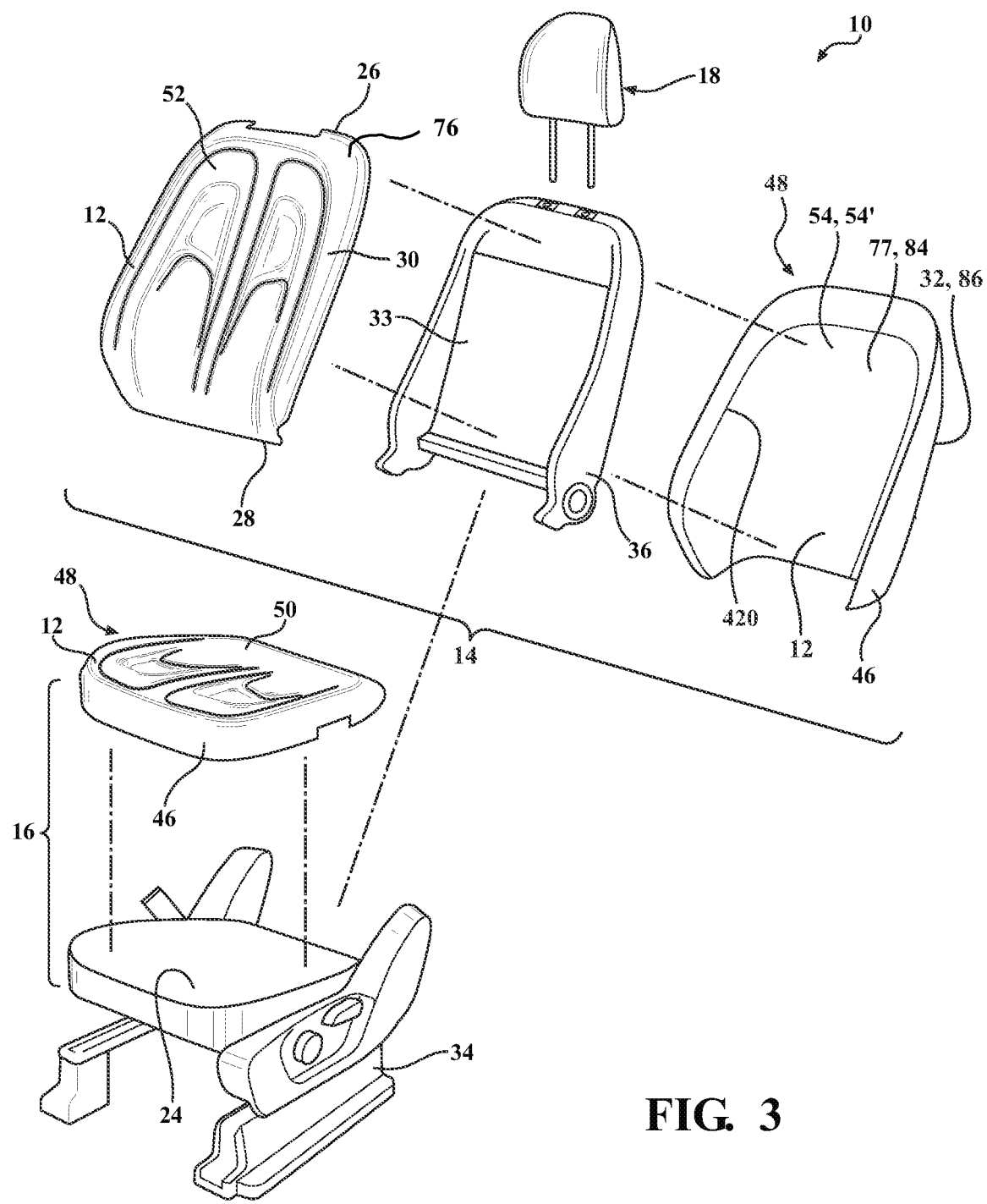
FIG. 3 illustrates an exploded view of the vehicle seat of FIG. 1.

FIGS. 1 and 2 illustrate perspective views of a vehicle seat assembly 10 having molded trim covers 12 according to embodiments of the present invention. FIG. 3 shows an exploded view of the vehicle seat assembly 10 of FIGS. 1 and 2. Referring to FIGS. 1, 2 and 3, the vehicle seat assembly 10 has a seat back 14 pivotally connected to a seat cushion 16 and a head restraint 18 coupled with the seat back 14, as is commonly known in the art. The seat cushion 16 extends between a front end 20 and an opposite rear end 22 adjacent the seat back 14. The seat cushion 16 comprises a base foam pad 24 as well as other optional components. The seat back 14 extends between a top end 26 and an opposite bottom end 28 adjacent the rear end 22 of the seat cushion 16. The seat back 14 includes a front surface 30 and a back surface 32. The seat back 14 comprises a base foam pad 33 as well as other optional components.

As shown in FIG. 3, each of the seat cushion 16 and the seat back 14 includes a frame 34, 36 for supporting a molded base foam pad 24, 33. The seat cushion 16 and the front and back surfaces 30, 32 of the seat back 14 are encased in molded trim covers 12 and other optional trim components. The seat back 14 is encased by one or more side pieces 46, a seat back trim cover 52, and a seat back panel 54 as shown in FIGS. 2 and 3. The seat cushion 16 is encased with a seat cushion trim cover 50 optionally adjoined to one or more side pieces 46 to form a seat trim cover assembly 48. As illustrated in FIG. 3, the seat trim cover assembly 48 is assembled with the base foam pad 24 to form the seat cushion 16. Further, the seat back trim cover 52, the seat back panel 54, optional side pieces 46, the base foam pad 33, and the frame 36 are assembled together to form the seat back 14. In certain embodiments, a seat back trim cover 52 is directly adjoined to the seat back panel 54 without including intermediary side pieces 46. The seat back trim cover 52, seat back panel 54, and the seat cushion trim cover 50 are generically described herein as a trim cover 12. Likewise, any specific trim cover 12, such as the seat back panel 54, the seat cushion trim cover 50, and the like, adjoined with a second component 46, such as a side piece 46, is generically described as a seat trim cover assembly 48. As such, when a specific trim cover 12 is shown and/or described herein, such as a seat back panel 54, a seat cushion trim cover 50, a seat back trim cover 52, and the like, it is with the understanding that other embodiments of the present disclosure include alternate trim covers 50, 52, 54.

The present invention relates to a process for molding trim covers 12 for a vehicle seat assembly 10. More specifically, the disclosed molded trim covers 12 have multiple sewing alignment features S1, S2, S3 (see FIG. 19) improving the appearance of sew seams when the molded trim covers 12 are joined to a second component 46.

Figure 4:
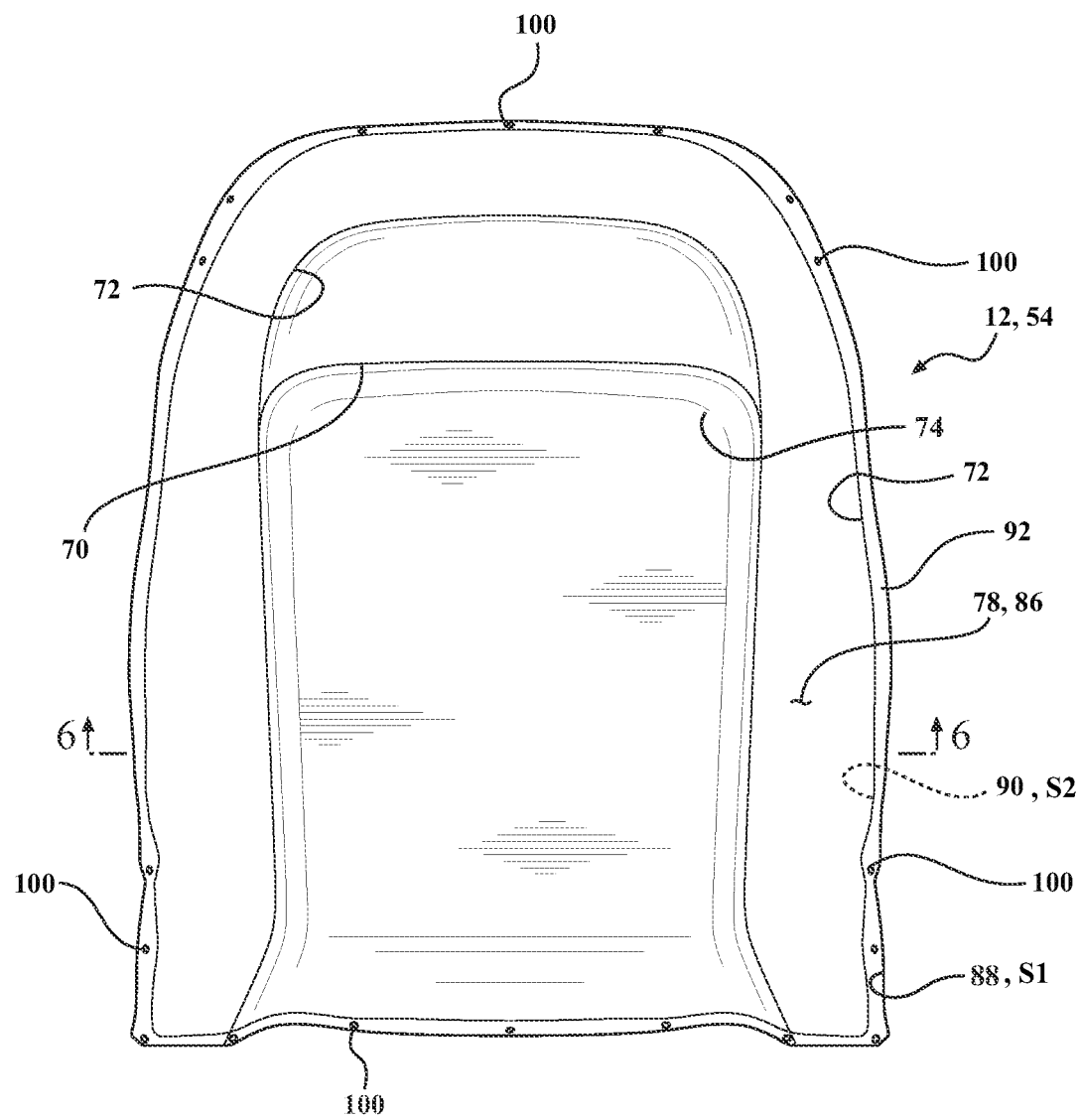
FIG. 4 illustrates an A-surface of a molded trim cover, according to one embodiment of the present invention.
Figure 5:
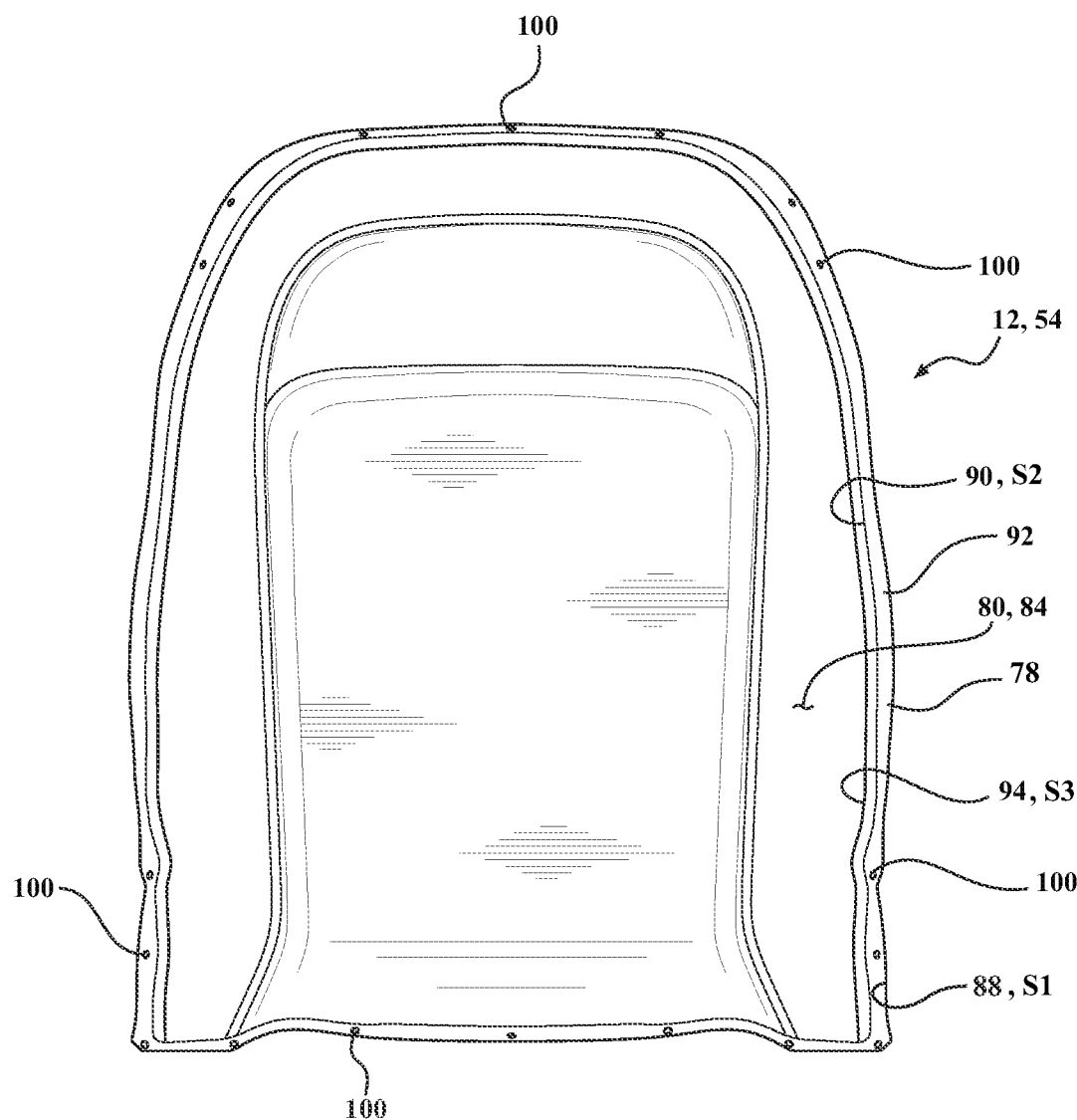
FIG. 5 illustrates a B-surface of the molded trim cover of FIG. 4, illustrating multiple sewing alignment features.

An A-surface view and a B-surface view of an exemplary molded trim cover 12 are shown in FIGS. 4 and 5, respectively, and illustrate molded features 70, molded lines 72 having the appearance of sew seams, surface concavity 74, a 3-dimensional shape, as well as multiple sewing alignment features S1, S2, S3. Referring to FIG. 3, the A-surface of the seat back trim cover 52, illustrated as element 76, faces the occupant of a vehicle when the trim cover 12 is assembled as part of a vehicle seat assembly 10. The B-surface of the seat back panel 54, illustrated by element 77, faces an interior of the vehicle seat assembly 10 when the seat back panel 54 is assembled as part of the vehicle seat assembly 10. A cross-sectional view of the trim cover 12 of FIGS. 4 and 5 is shown in FIG. 6. An enlarged portion of the cross-sectional view of the trim cover 12 is shown in FIG. 7.

Figure 8:
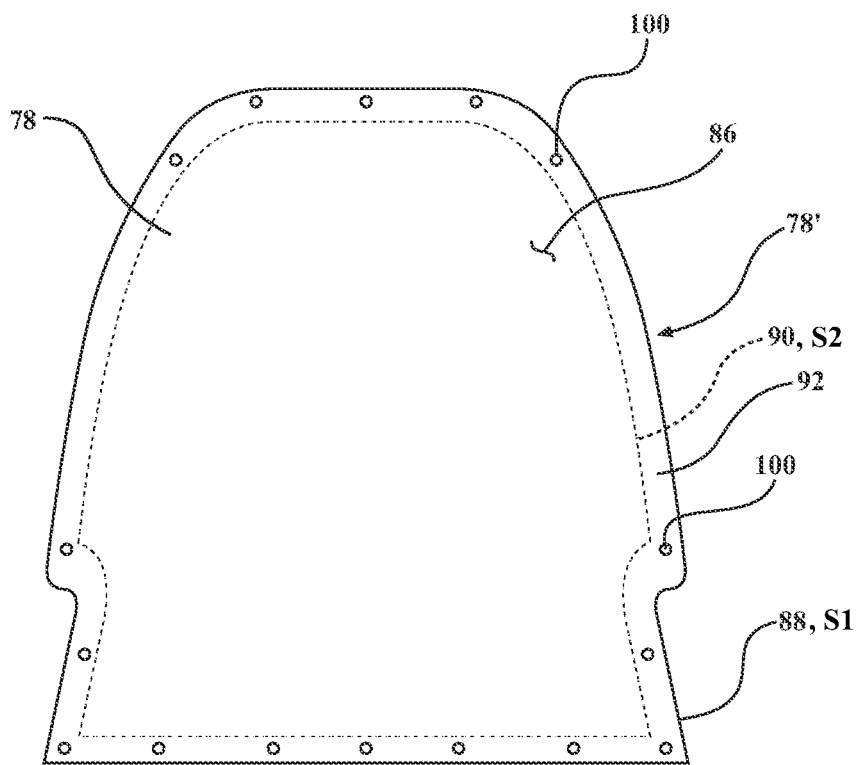
FIG. 8 illustrates an A-surface of a cover material blank, according to one embodiment of the present invention.

Referring to FIGS. 6 and 7, the trim cover 12 comprises a cover material blank 78' that is vacuum-formed into a 3-dimensional shape. The cover material blank 78' comprises at least a cover material 78 with certain embodiments including additional components. The cover material blank 78' is shown in FIG. 8 prior to being formed into the trim cover 12. A front surface 86 of the cover material blank 78' forms the "A-surface" 76 of the trim cover 12. A molded foam backing 80 is formed on a back surface 86A of the cover material blank 78' after the vacuum-forming process and includes multiple sewing alignment features S1, S2, S3. An outer surface 84 of the molded foam backing 80 oriented away from the cover material blank 78' and defines a back surface of the trim cover 12 commonly described as the "B-surface" 77.

Turning to FIG. 7, the cover material blank 78' is illustrated as a single layer of a material such as a textile, leather, and/or vinyl; however, it will be appreciated that in some embodiments the cover material blank 78' can include a plurality of layers precut and/or preassembled into a laminated cover material blank 78'. It will be appreciated that the individual layers forming the laminated cover material blank 78' can be assembled in any order suitable for an intended application and desired manufacturing process. Further, it will be appreciated that any suitable adhesive may be selected based on the desired manufacturing process and composition of the cover material 78 forming the A-surface 76. In addition, it will be appreciated that adhesive layers can be replaced with flame lamination as is generally known in the art. For example, a non-woven scrim backing layer may be adhered to the cover material 78 using adhesive or using flame lamination and prior to or after cutting the cover material 78 to form the cover material blank 78'. It will be appreciated that one or more sensors, electrical circuits, and/or alternate materials such as fiber batting and/or a foam lining can be incorporated into cover material blank 78' if desired. Also, while not specifically shown in the Figures, in certain embodiments the cover material blank 78' can comprise one or more pieces of material fastened together along a seam and/or layered together if desired. For example, a pocket can be pre-sewn, layered with, and/or adhered to the cover material 78 as part of the cover material blank 78'. Further, other embodiments comprise a cover material blank 78' formed by sewing two or more materials together along seam(s) to create a desired style. In other embodiments, the cover material blank 78' can include a layered, pre-joined, and/or adhered pocket, decorative feature, trim component, and the like, as non-limiting examples.

As shown in FIG. 7, the trim cover 12 comprises the cover material blank 78' adjoined to the molded foam backing 80. The cover material blank 78' has an outer periphery 88 spaced apart from an end surface 90 of the molded foam backing 80 to form a foam-free selvage 92 extending around at least a portion of the outer periphery 88 of the trim cover 12. The outer periphery 88 of the cover material blank 78' defines a first sewing alignment feature S1. The end surface 90 of the molded foam backing 80 projects at an angle away from the cover material blank 78' and defines a second sewing alignment feature S2.

Also shown in FIG. 7, the molded foam backing 80 includes a stepped edge profile P defined by the end surface 90 projecting at an angle from the back surface 86A of the cover material blank 78', a second surface 93 projecting at an angle from the end surface 90, a third surface 94 projecting at an angle from the second surface 93, and a fourth surface 95 projecting at an angle from the third surface 94. The third surface 94 is oriented in a similar direction as the end surface 90 with the second surface 93 forming a step between the end surface 90 and the third surface 94. The third surface 94 defines a third sewing alignment feature S3. Alternate embodiments of the stepped edge profile P may include tapered surfaces, contoured surfaces, and/or curved surfaces joining adjacent surfaces 90, 93, 94, 95 as desired for specific applications without varying from the scope of the invention.

One embodiment of a process of forming a trim cover 12 having a plurality of sewing alignment features S1, S2, S3 is illustrated and described with respect to FIGS. 8 through 16. FIG. 8 shows a precut cover material blank 78' formed by cutting a cover material 78 into a predefined shape. In certain embodiments, the cover material blank 78' has one or more layers assembled and/or adhered to form a laminated cover material blank 78'. In other embodiments, the cover material blank 78' comprises a single layer of material, such as a textile, leather, vinyl, and the like. It will be appreciated that more or less layers of material, such as textile, leather, and/or vinyl, can be included in the cover material blank 78' as desired for a particular application without varying the scope of the invention. For example, in certain embodiments, the cover material blank 78' can include a cover material 78 assembled with a scrim backing layer comprising a woven and/or non-woven textile. Further, it will be appreciated that additional components can be added to the cover material blank 78', such as a seat heater, adhesive, a fastener, a sensor, embedded electronics, and the like. Generally, the cover material blank 78' has a 2-dimensional shape, i.e. the cover material blank 78' is generally flat when resting unconstrained on a flat surface. Preferably, the shape and size of the cover material blank 78' are selected so that minimal or no trimming is required after molding the trim cover 12 and prior to assembly with a second component 46. The front surface 86 of the cover material blank 78' is generally referred to as the "A-surface" 76 of the trim cover 12.

Suitable cover materials 78, for inclusion in the cover material blank 78' shown in FIG. 8, include a variety of textiles, vinyls, and leathers. Exemplary textiles include polyester, polyester blends, acrylic blends, rayon, nylon, and similar fabrics. The selection of a textile for a desired application depends on the amount of elongation in the lengthwise and the crosswise direction of the textile in conjunction with the amount of forming required during the molding process. Generally, cover materials 78 having about 10% to about 25% elongation in both the lengthwise and crosswise directions have been found to be desirable. However, cover materials 78 with more or less elongation may be suitable depending on the desired 3-dimensional molded shape and the amount of concavity in the mold tools. Fabrics can have a flat surface, a knap construction, and/or be woven or non-woven, depending on the desired appearance of the molded trim cover 12. Optionally, fabrics can be laminated with foam materials or spacer fabric constructions to generate a desired appearance of the molded trim cover 12.

Figure 17:
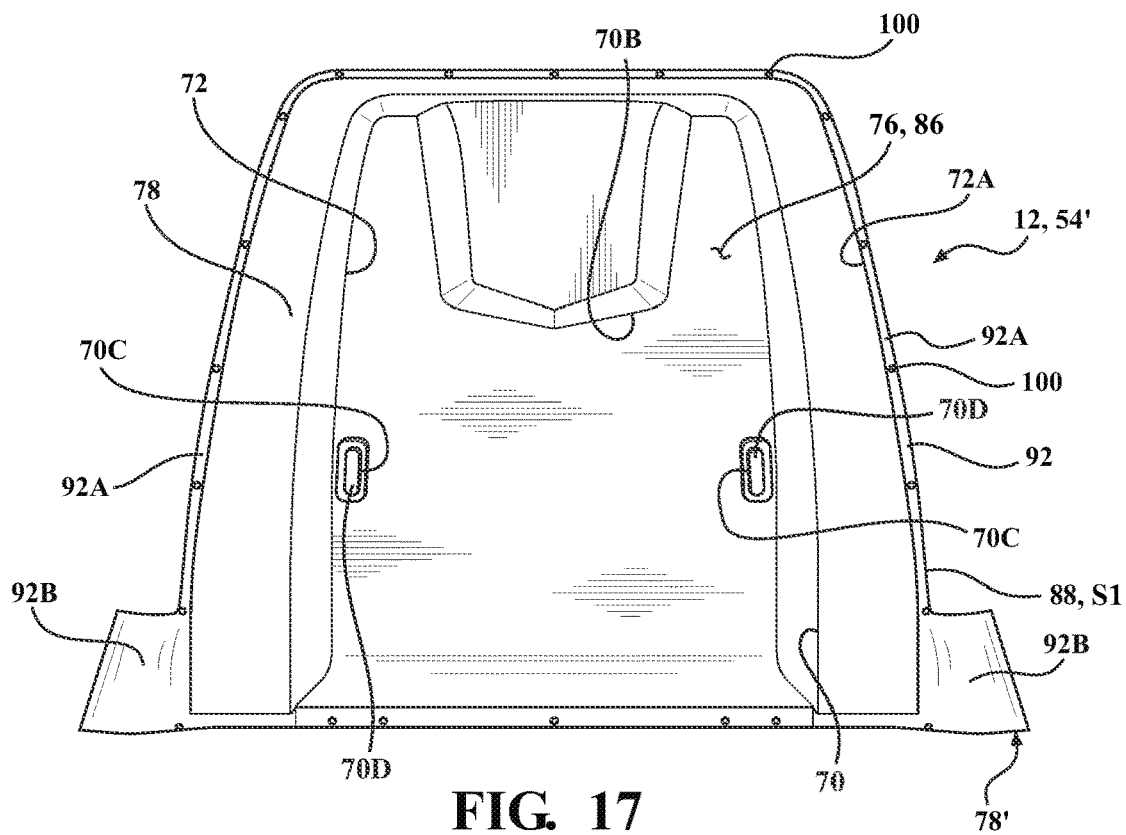
FIG. 17 illustrates an A-surface of a molded seat trim cover, according to another embodiment of the present invention.
Figure 18:
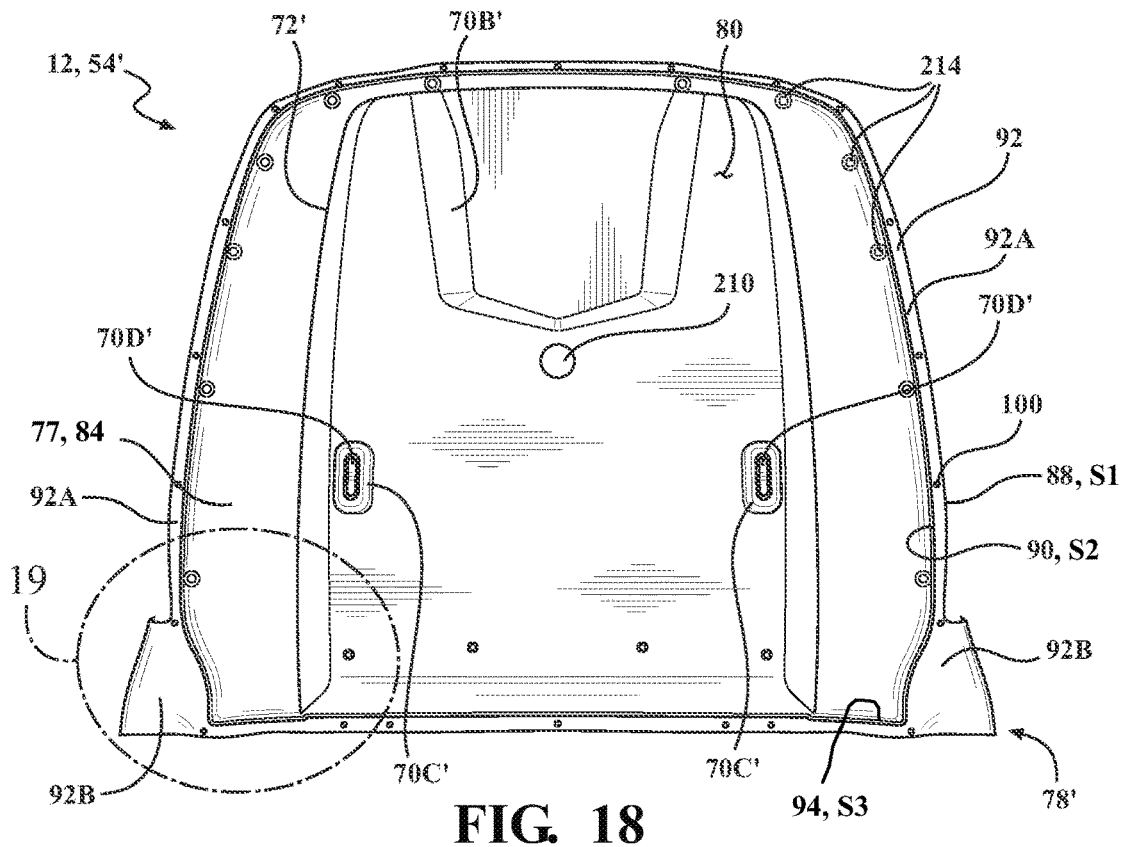
FIG. 18 illustrates a B-surface of the molded seat trim cover of FIG. 17, illustrating multiple sewing alignment features.

In back-of-back applications, such as the seat back panel 54 shown in FIGS. 4 and 5, the molded foam backing 80 is preferably formed of a relatively dense foam so that the seat back panel 54 has a smooth appearance while retaining the desired shape. In the embodiment illustrated in FIGS. 4 and 5 and the embodiment shown in FIGS. 17 and 18, the molded foam backing 80 is formed on the cover material blank 78' after the cover material blank 78' is vacuum-formed into a 3-dimensional shape. As such, each of the seat back panels 54, 54' of FIGS. 4, 5, 17 and 18 illustrates vacuum-formed molded features and lines 70, 72. Optionally, other embodiments of trim covers 12 can include additional molded features 70B, 70B', 70C, 70C', 70D, 70D', such as illustrated in the seat back panel 54' of FIGS. 17 and 18. Certain molded features and lines 70, 72 optionally have a curved surface profile, an embossed appearance, and/or have the appearance of a sew seam. While seat back panels 54, 54' are illustrated in FIGS. 4, 4, 17 and 18, alternate embodiments of the trim covers 12 include seat back trim covers 52, seat cushion trim covers 50, as well as other trim cover components, such as side pieces 46, and the like. The molded seat back panels 54, 54' of FIGS. 4, 5, 17 and 18 include a foam-free selvage 92 extending around the outer periphery 88 of the seat back panel 54, 54' that is free of molded foam backing 80 and include multiple sewing alignment features S1, S2, S3.

Turning to FIG. 8, the cover material blank 78' is pre-cut into a predefined shape having an outer periphery 88 defining the first sewing alignment feature S1. A plurality of locating holes 100 are punched through the cover material blank 78' near the outer periphery 88. Any number, shape, size, and location of pre-punched locating holes 100 can be included in the cover material blank 78' as desired for specific embodiments. The locating holes 100 can be punched before, during, or after the cover material blank 78' is cut from the cover material 78. Preferably, each locating hole 100 passes through the foam-free selvage 92 of the cover material blank 78'. The foam-free selvage 92 extends between a predefined end surface 90 and the outer periphery 88 of the cover material blank 78', as shown in FIG. 8. In some embodiments, the cover material blank 78' can include alternate locating features such as slots, slits, tabs, and the like, as non-limiting examples. Further, in some embodiments, the locating holes 100 can be omitted if the locating holes 100 are not required to position the cover material blank 78' during processing.

Figure 9:
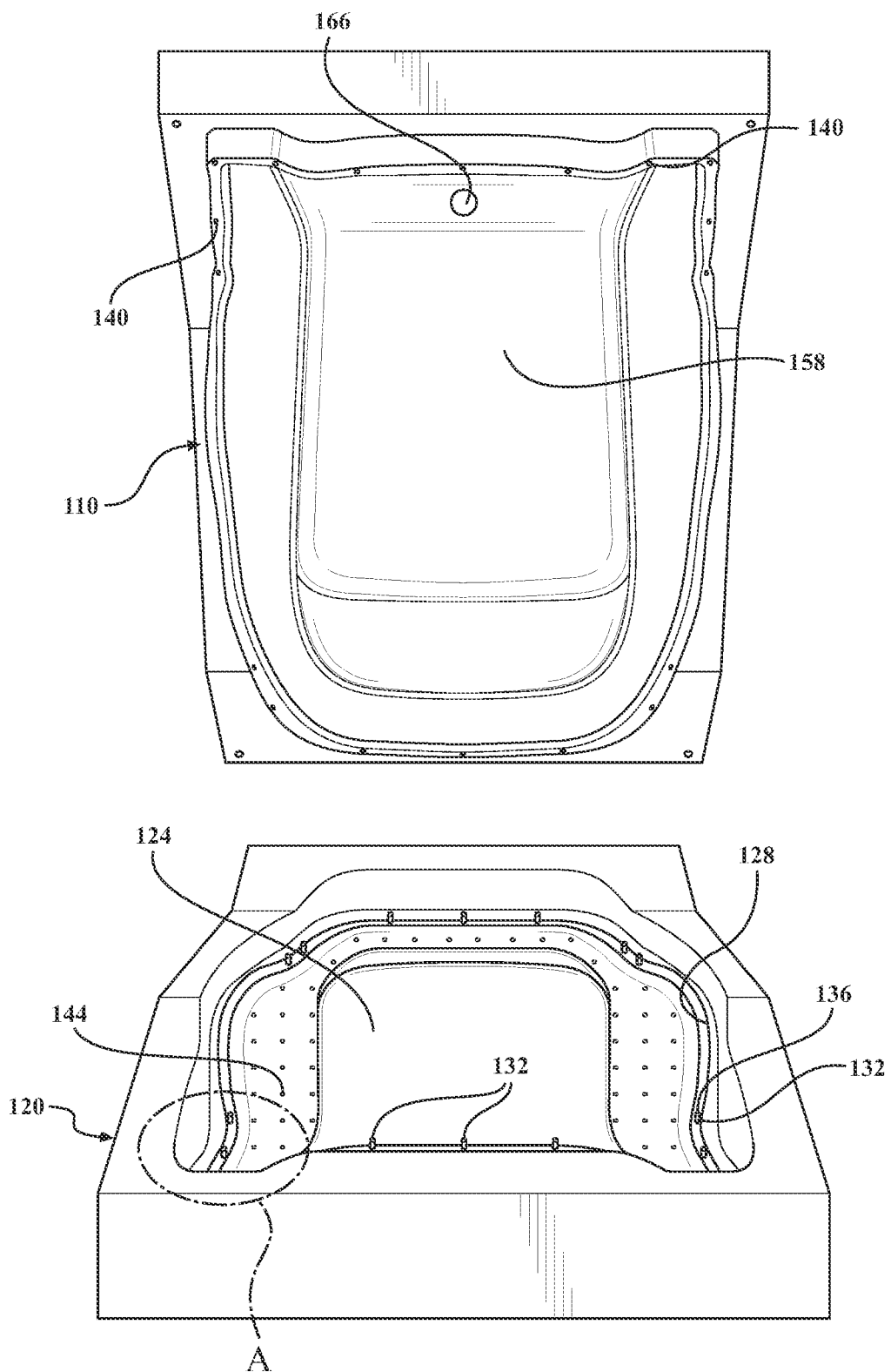
FIG. 9 illustrates a perspective view of a lower mold tool and an upper mold tool, according to one embodiment of the present invention.

FIGS. 9 through 16 illustrate an exemplary manufacturing process for forming the trim cover 12, such as the seat back panel 54 of FIGS. 4 and 5, according to the present invention. FIG. 9 shows an exemplary embodiment of molding tools 110, 120 suitable for forming the seat back panel 54, as well as for forming other trim covers 12. The exemplary molding tools 110, 120 include an upper mold lid 110 and a lower mold base 120. The mold base 120 includes a 3-dimensional mold bowl 124 having a desired molded shape for the seat back panel 54. An outer periphery 128 of the 3-dimensional mold bowl 124 includes a plurality of spaced apart locating pins 132. The number and position of the locating pins 132 is selected based in part on the size and shape of the outer periphery 128 of the 3-dimensional mold bowl 124. The locating pins 132 are configured to matingly engage with the locating holes 100 in the cover material blank 78'.

Figure 10:
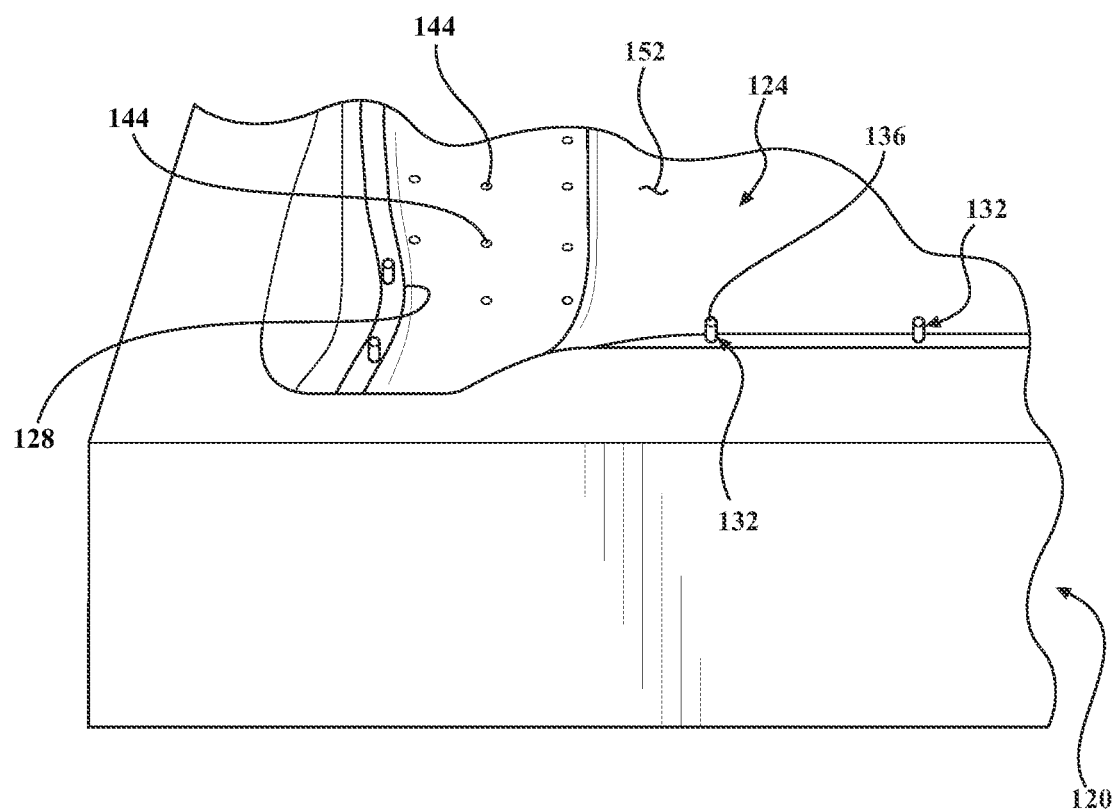
FIG. 10 shows an enlarged fragmentary view of portion A of the lower mold tool shown in FIG. 9, illustrating mold locating features and vacuum holes.

An enlarged view of portion A of the mold base 120 of FIG. 9 is shown in FIG. 10, illustrating locating pins 132 positioned around the outer periphery 128 of the 3-dimensional mold bowl 124. Also shown in FIG. 10, the 3-dimensional mold bowl 124 includes a plurality of vacuum holes 144 distributed across a lower surface 152 of the 3-dimensional mold bowl 124. In one embodiment, the vacuum holes 144 have an outer diameter of about 0.003". However, larger and/or smaller diameter vacuum holes 144 can be used if desired based on specific requirements of an embodiment.

Returning to FIG. 9, the mold lid 110 includes a plurality of lid holes 140 configured to matingly engage with the locating pins 132 around the outer periphery 128 of the 3-dimensional mold bowl 124. More specifically, the locating pins 132 and the lid holes 140 are configured such that an upper end 136 of each locating pin 132 fits within a respective one of the lid holes 140 when the mold lid 110 is placed in a closed position in frictional engagement with the mold base 120.

Figure 11:
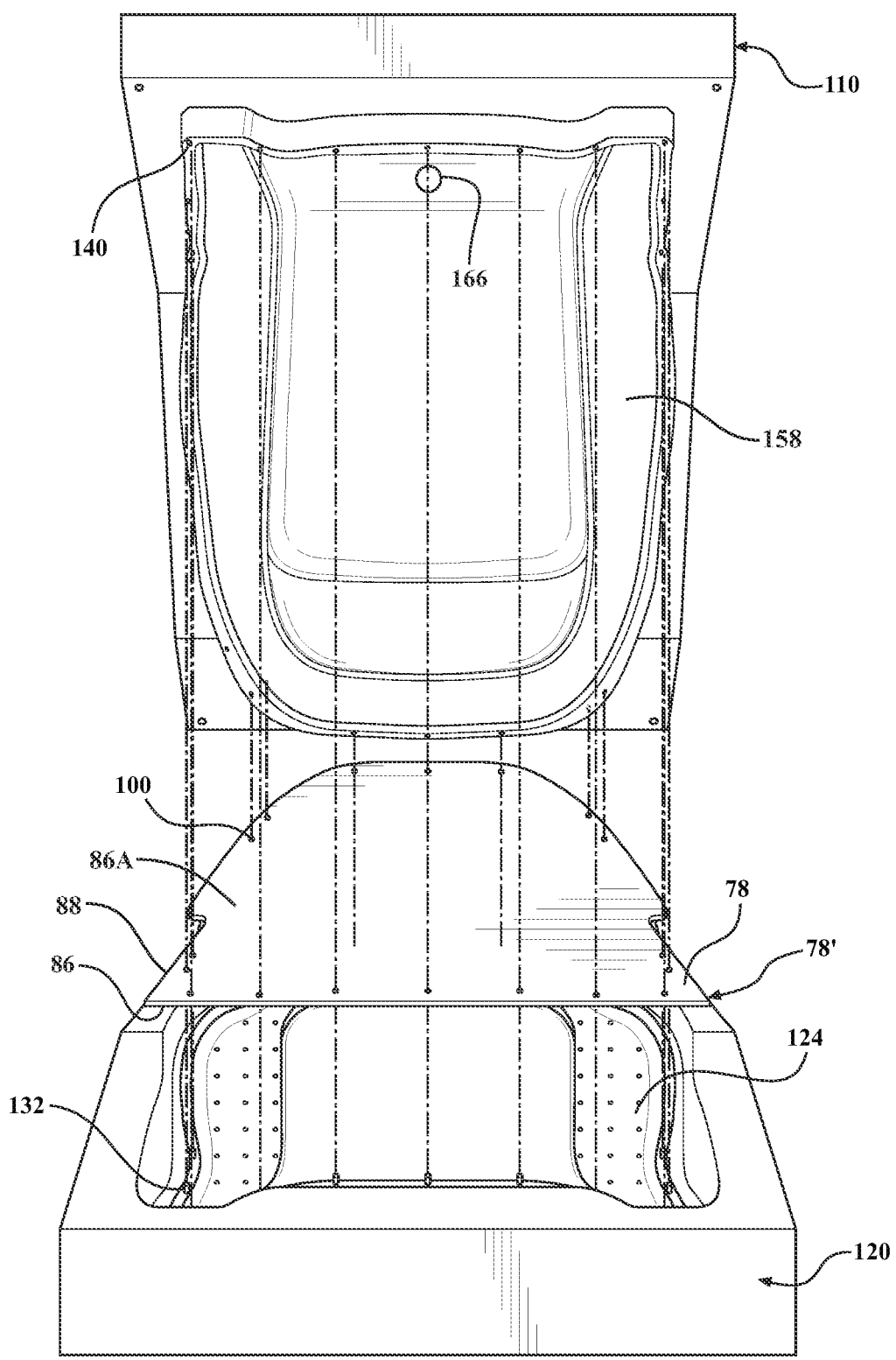
FIG. 11 illustrates a perspective view of the cover material blank of FIG. 8 inserted between the lower mold tool and the upper mold tool of FIG. 9.
Figure 12:
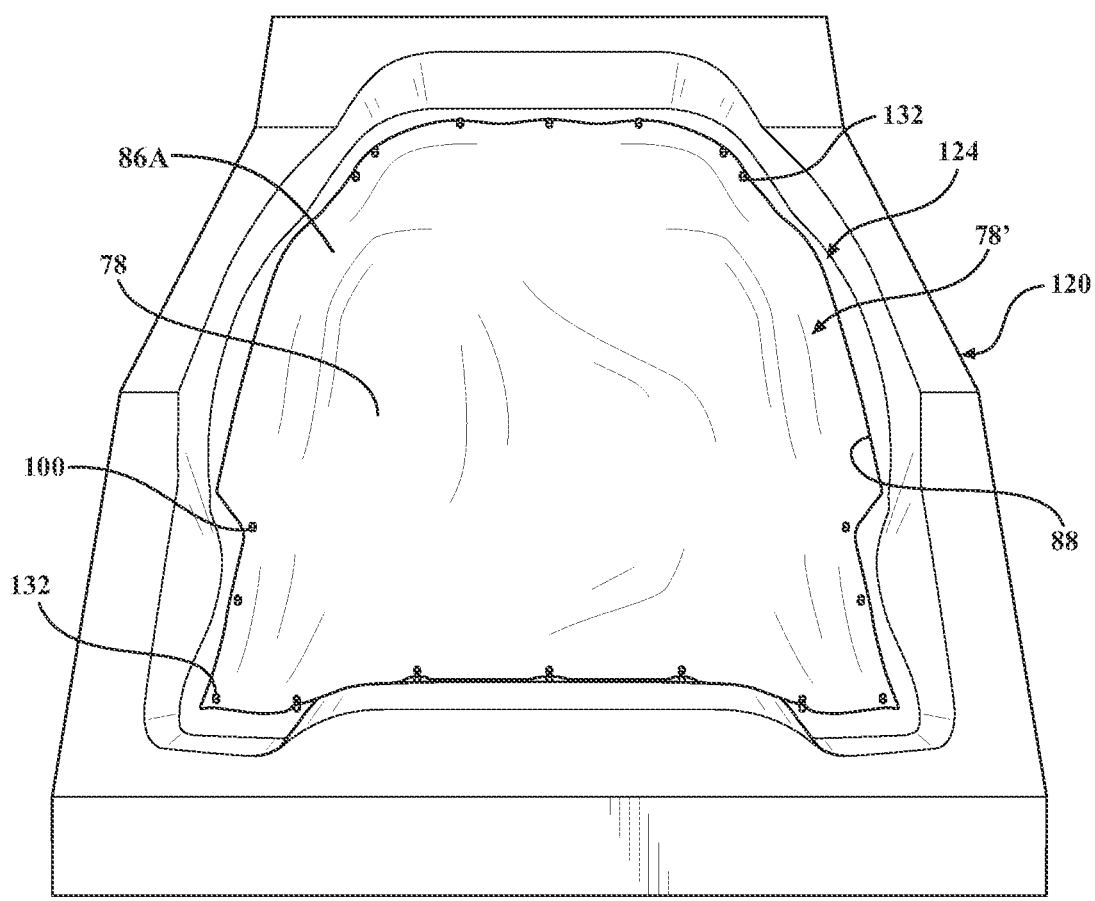
FIG. 12 shows a perspective view of the cover material blank of FIG. 8 assembled with the lower mold tool of FIG. 9, illustrating locating features of the cover material blank aligned with locating pins projecting from the lower mold tool.

Referring to FIG. 11, the cover material blank 78' is inserted between the mold lid 110 and the mold base 120. More specifically, the cover material blank 78' is assembled with the 3-dimensional mold bowl 124 by aligning the locating holes 100 in the cover material blank 78' with the locating pins 132 extending vertically from the mold base 120. Prior to fixedly coupling the mold lid 110 to the mold base 120, an upper molding surface 158 of the mold lid 110 is preferably coated with a mold release. The upper molding surface 158 of the mold lid 110 defines a 3-dimensional upper molding surface 158 for forming the outer surface 84 of the molded foam backing 80. As illustrated in FIG. 12, the cover material blank 78' is positioned against the mold base 120 such that the locating pins 132 extend through the locating holes 100 in the cover material blank 78'.

Figure 13:
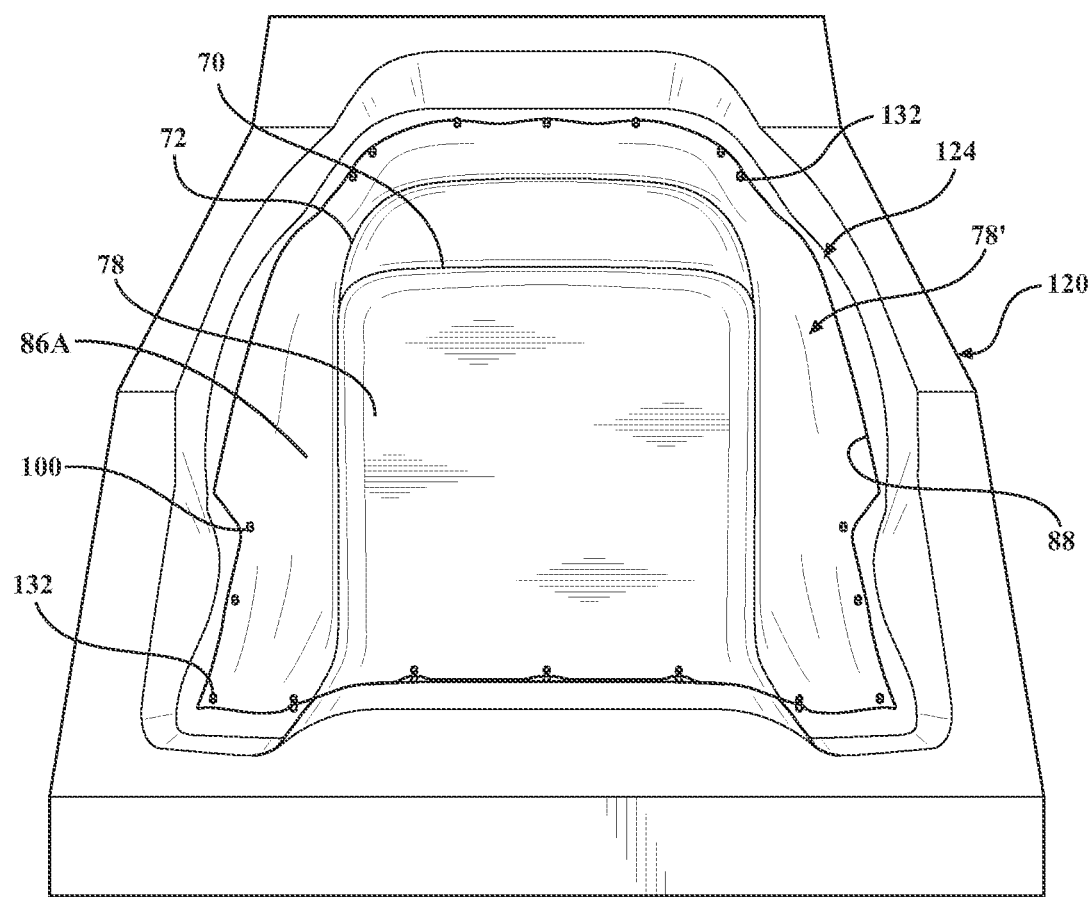
FIG. 13 illustrates a perspective view of the cover material blank assembled with the lower mold tool of FIG. 12 and after a vacuum-forming process, according to one embodiment of the present invention.

The cover material blank 78' is vacuum formed to conform to the contour of the 3-dimensional mold bowl 124, as illustrated in FIG. 13. Air is drawn through the vacuum holes 144 in the lower surface 152 of the 3-dimensional mold bowl 124 during the vacuum forming process. The vacuum forming process can be performed before or after placing the mold lid 110 against the mold base 120. The locating holes 100 in the cover material blank 78' assembled with the locating pins 132 retains the outer periphery 88 of the cover material blank 78' in a desired position during the vacuum forming process. Molded features 70 and molded lines 72 are formed in the cover material blank 78' during the vacuum forming process, as shown in FIG. 13.

Figure 14:
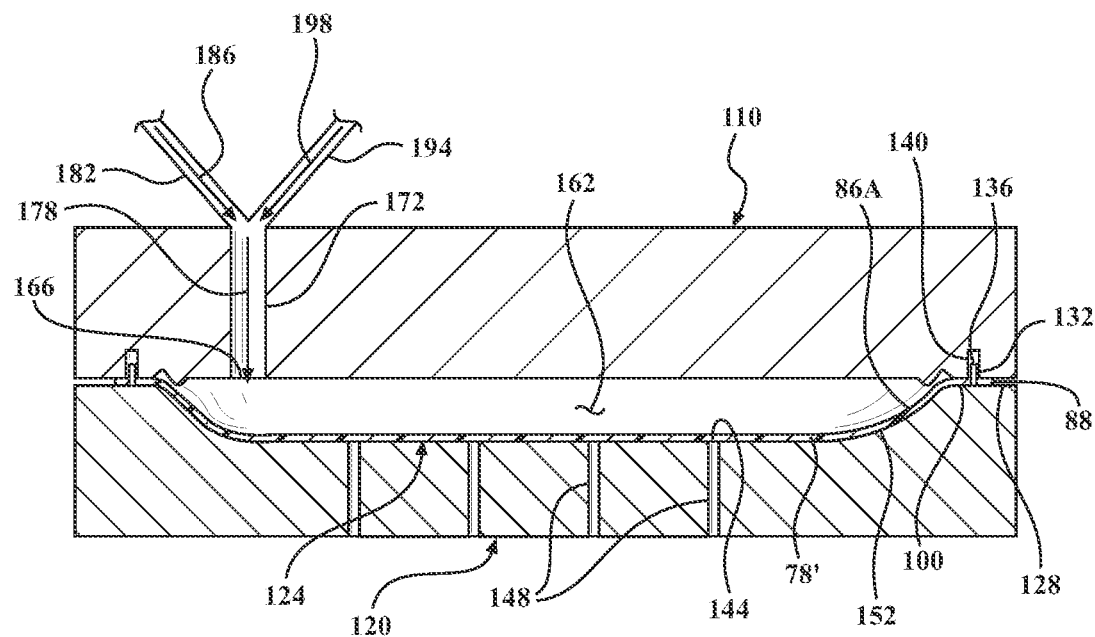
FIG. 14 shows a cross-sectional view of the upper mold tool, the lower mold tool, and the cover material blank after the vacuum-forming process of FIG. 13, illustrating the cover material blank conforming to the lower mold tool.

FIG. 14 shows a cross-sectional view of the mold lid 110 fixedly coupled to the mold base 120. The vacuum formed cover material blank 78' is positioned against the 3-dimensional mold bowl 124 with the outer periphery 88 of the cover material blank 78' retained by the locating pins 132 passing through the locating holes 100 in the cover material blank 78'. The upper end 136 of each locating pin 132 is inserted within a respective mating lid hole 140 in the mold lid 110. The outer periphery 88 of the cover material blank 78' is pinched between the mold lid 110 and the mold base 120, forming a seal around the outer periphery 128 of the 3-dimensional mold bowl 124. In one embodiment, the mold base 120 and mold lid 110 are configured to provide about a 0.5 mm parting line gap to accommodate the outer periphery 88 of the cover material blank 78'.

Also shown in FIG. 14, each vacuum hole 144 in the 3-dimensional mold bowl 124 is fluidically coupled to a respective vacuum air channel 148. A vacuum pressure is applied to the vacuum air channels 148 during the vacuum process to draw the cover material blank 78' against the lower surface 152 of the 3-dimensional mold bowl 124. Vacuum forming the cover material blank 78' against the lower surface 152 of the 3-dimensional mold bowl 124 forms a cavity 162 between the cover material blank 78' and the mold lid 110, as shown in FIG. 14. Preferably, the mold base 120 and/or the mold lid 110 are heated to a temperature between about 140° F. to about 150° F. However, other molding temperatures can be selected in other embodiments depending on requirements of specific manufacturing processes.

Figure 15:
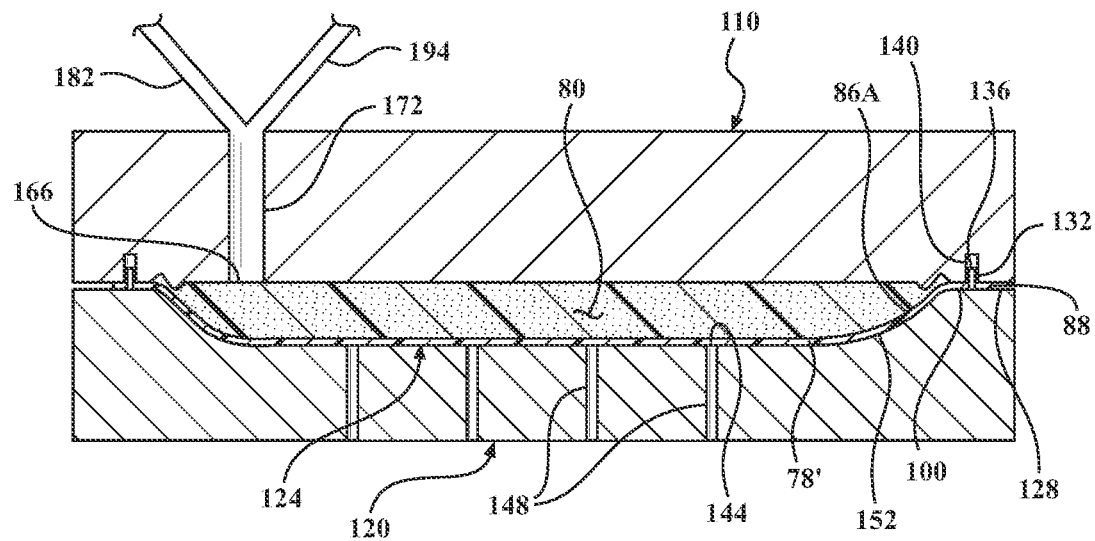
FIG. 15 shows a cross-sectional view of the upper mold tool, the lower mold tool, and the cover material blank of FIG. 14 after injection of foam ingredients to form a molded trim cover.

Referring to FIGS. 14 and 15, the mold lid 110 includes an inlet port 166 for injecting liquid into the cavity 162 bounded by the cover material blank 78' and the mold lid 110. The inlet port 166 is fluidically connected to an inlet channel 172 passing through the mold lid 110. The inlet channel 172 is fluidically coupled to at least a first fill line 182 and a second fill line 194. The first and second fill lines 182, 194 are configured to provide a first liquid 186 and a second liquid 198, respectively, into the inlet channel 172. In other embodiments, the inlet channel 172 is fluidically coupled to a plurality of fill lines 182, 194 with each fill line 182, 194 configured to provide one liquid additive 186, 198 to the inlet channel 172. The first and second liquids 186, 198 are mixed within the inlet channel 172 to form a mixed liquid 178 that is injected through the inlet port 166 and into the cavity 162. The first and second liquids 186, 198, along with potentially other selected components based on the specific requirements of a selected trim cover 12, can comprise in part a blended polyol 186 and isocyanate (ISO) 198, as a non-limiting example. The blended polyol 186 and the isocyanate 198 are injected and/or poured through the first fill line 182 and second fill line 194, respectively, and into the inlet channel 172. Mixing and injecting the blended polyol 186 and isocyanate 198 into the cavity 162 between the cover material blank 78' and the mold lid 110 causes the blended polyol 186 and the isocyanate 198 to react and form a molded polyurethane foam backing 80 within the cavity 162. As shown in FIG. 15, the molded foam backing 80 is adhered to the cover material blank 78' during the reaction process. The assembly of the molded foam backing 80 and the cover material blank 78' forms the trim cover 12, such as the seat back panel 54 shown in FIGS. 4 and 5. In some embodiments of the trim cover 12, the molded foam backing 80 has a density of about 425 kg/m$^3$, a thickness of about 3 mm, and a cure time of about 2 minutes.

Figure 16:
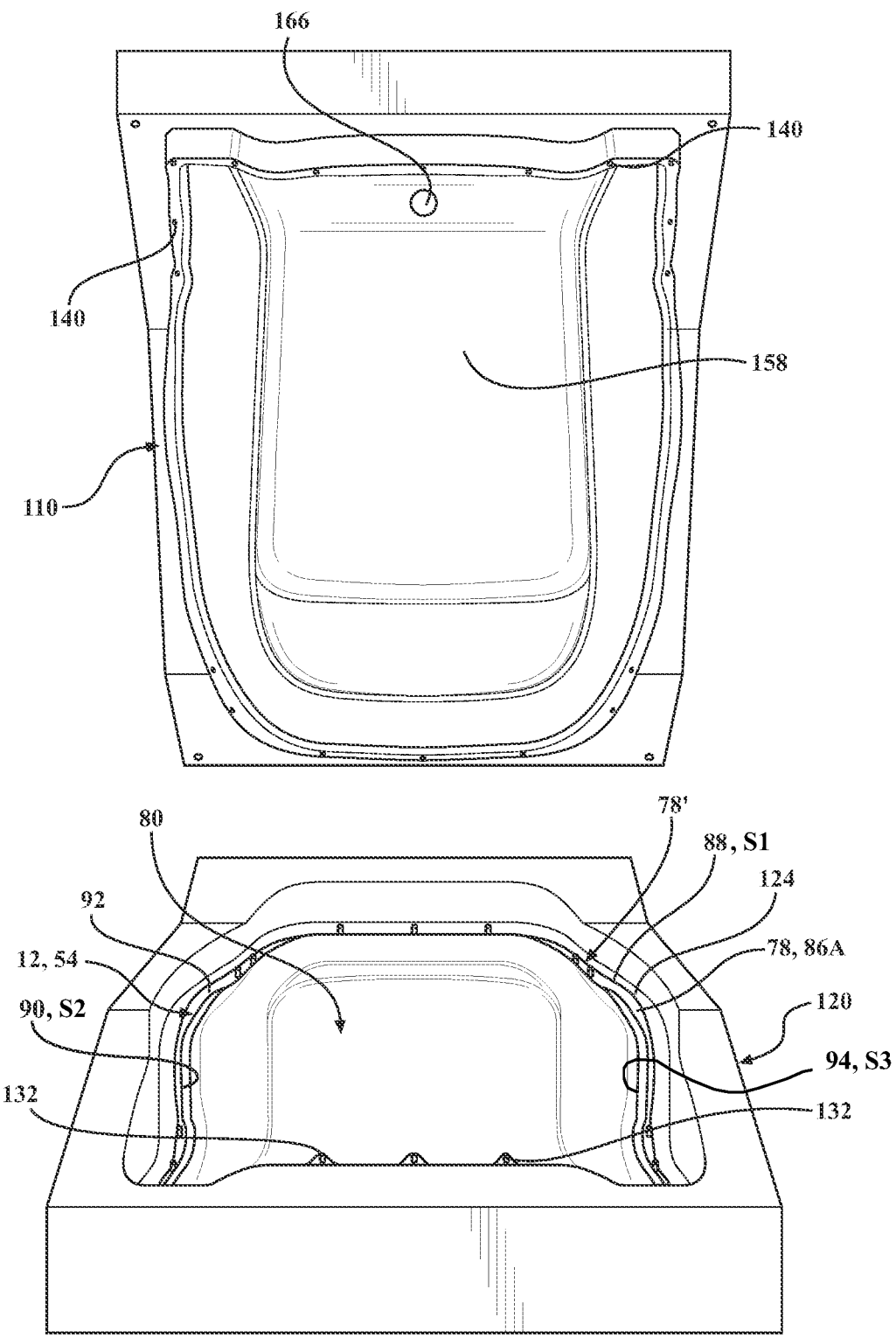
FIG. 16 shows a perspective view of the upper mold tool, the lower mold tool, and the molded trim cover of FIG. 15 prior to removal of the molded trim cover from the lower mold tool.

Referring to FIG. 16, once the foam reaction process is complete, the mold lid 110 is removed from the mold base 120. As shown in FIG. 16, the outer periphery 88 of the cover material blank 78' is free of foam. The molded foam backing 80 has an end surface 90 spaced apart from the outer periphery 88 of the cover material blank 78' to form the foam-free selvage 92 extending around the outer periphery 88 of the trim cover 12. The foam-free selvage 92 of the cover material blank 78' forms a gasket between the mold lid 110 and the mold base 120. Thus, the foam-free selvage 92 is spaced apart from the molded foam backing 80 formed by the reaction of the blended polyol 186 and the isocyanate 198 within the cavity 162. In addition, the molded foam backing 80 includes sewing alignment features S2, S3 integrated within the molded foam backing 80. After the mold lid 110 is removed from the mold base 120, the trim cover 12 can be removed from the 3-dimensional mold bowl 124. Optionally, the trim cover 12 is placed in a cooling fixture after removal from the mold base 120, allowing the molded foam backing 80 to cool down. The outer periphery 88 of the molded trim cover 12 is optionally trimmed and/or skived prior to assembling and/or sewing with other seat components to form the finished seat trim cover assembly 48.

FIGS. 17 and 18 show another embodiment of a seat back panel 54' produced using the manufacturing process illustrated in FIGS. 8 through 16. FIGS. 17 and 18 show the A-surface 76 and B-surface 77, respectively, of the seat back panel 54'. The A-surface 76 of the seat back panel 54' faces outward from the vehicle seat assembly 10 with the B-surface 77 facing towards the interior of the vehicle seat assembly 10 when assembled as part of the vehicle seat assembly 10, as further illustrated in FIG. 3.

As with the seat back panel 54 shown in FIGS. 4 and 5, the seat back panel 54' of FIGS. 17 and 18 includes a cover material blank 78' comprising a cover material 78 that forms the front surface 86 of the seat back panel 54'. In the embodiment shown in FIGS. 17 and 18, the cover material blank 78' is formed of a cover material 78 comprising a vinyl textile. However, other materials such as fabric and/or leather can be substituted for the vinyl textile. In addition, the cover material blank 78' forming the front surface 86 of the seat back panel 54' can include a plurality of layers if desired for specific embodiments, including but not limited to a foam interlayer, a scrim backing layer, a plurality of pre-sewn pieces, a pre-sewn pocket, and the like. The front surface 86 of the seat back panel 54' shown in FIG. 17 includes molded features 70 and molded lines 72 formed during the vacuum forming step described with respect to FIG. 13. Various embodiments can include any number, contour, and combination of molded features 70 and molded lines 72 as desired for specific applications.

Further, the width of the foam-free selvage 92 can vary as required for specific applications, as illustrated in FIGS. 5 and 18. For example, in the embodiment shown in FIG. 5, the seat back panel 54 has a foam-free selvage 92 having a generally uniform width of approximately 8 mm extending around the outer periphery 88 of the seat back panel 54. In contrast, in the embodiment shown in FIG. 18, the seat back panel 54' has a foam-free selvage 92 comprising selvage sections 92A having a width of about 8 mm as well as selvage sections 92B having a width greater than about 8 mm. While a foam-free selvage 92 having a width of about 8 mm is preferred, the selected width of the foam-free selvage 92 can be larger and/or smaller than about 8 mm as desired for different embodiments. For example, a wider foam-free selvage 92 may be desirable depending in part on a selected manufacturing process, the complexity of the trim cover 12 design, and the like.

In the embodiment of the seat back panel 54' shown in FIG. 18, the molded foam backing 80 has an end surface 90 that corresponds to a molded line 72A on the front surface 86 shown in FIG. 17. Also, the molded foam backing 80 of the seat back panel 54' shown in FIG. 18 includes molded lines 70B' and molded features 70C', 70D' that generally correspond to respective molded lines 70B and molded features 70C, 70D visible on the front surface 86 shown in FIG. 17. Each of the molded features 70C' on the B-surface 77 of the seat back panel 54' includes an aperture 70D' that is free of foam. The cover material blank 78' extends across the apertures 70D'. The apertures 70D' are optionally pierced during an additional manufacturing process, providing a passageway 70D through the seat back panel 54' for a fastener. Additional molded features, such as a foam gate 210 formed by the inlet port 166 in the mold lid 110 and auto-vent marks 214 formed by venting channels within the mold lid 110, are visible on the B-surface 77 of the seat back panel 54'. Features such as the molded features 70, 70C, 70D, molded lines 70B, 72, molded apertures 70D', foam gate 210, and the auto-vent marks 214 will vary in location, size, number, and the like, in various embodiments of trim covers 12 formed using the manufacturing process described with respect to FIGS. 8 through 16. In some embodiments certain features can be omitted entirely.

Figure 19:
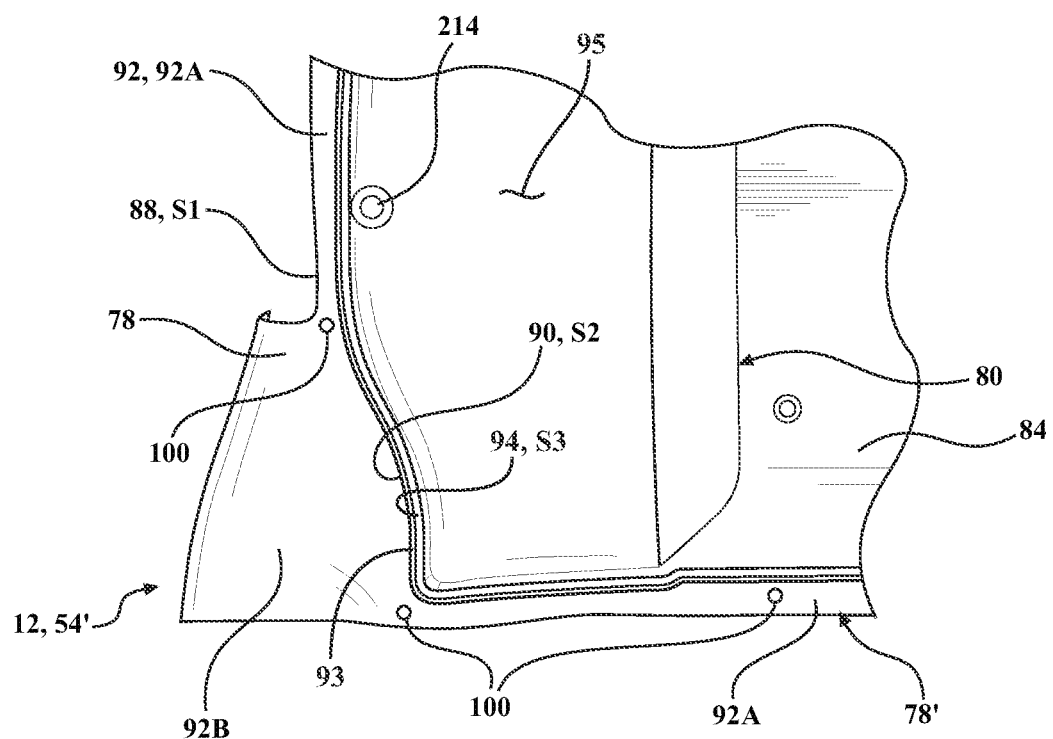
FIG. 19 shows an enlarged fragmentary view of a portion 19 of the molded seat trim cover of FIG. 18, illustrating multiple sewing alignment features.

An enlarged view of portion 19 of the B-surface 77 of the seat back panel 54' of FIG. 18 is shown in FIG. 19, further illustrating the foam-free selvage 92 extending between the end surface 90 of the molded foam backing 80 and the outer periphery 88 of the cover material blank 78'. The foam-free selvage 92 optionally includes both generally uniform narrow selvage sections 92A having an approximate width of about 8 mm and wider selvage sections 92B. The specific width of the foam-free selvage 92, including foam-free sections such as 92A and 92B, is selected based on the requirements of specific embodiments. The foam-free selvage 92 is formed by pinching the outer periphery 88 of the cover material blank 78' between the mold lid 110 and the mold base 120, preventing the adhesion of the molded foam backing 80 in these areas. Shown in FIG. 19 are locating holes 100 spaced around the outer periphery 88 of the cover material blank 78'. Also shown in FIG. 19 are a first sewing alignment feature S1 corresponding to the outer periphery 88 of the cover material blank 78', a second sewing alignment feature S2 corresponding to an end surface 90 of the molded foam backing 80, and a third sewing alignment feature S3 corresponding to a third surface 94 formed in the molded foam backing 80 generally extending away from the cover material blank 78' and spaced apart from the end surface 90 of the molded foam backing 80. The second and third sewing alignment features S2, S3 are integrally formed within the molded foam backing 80.

Figure 20:
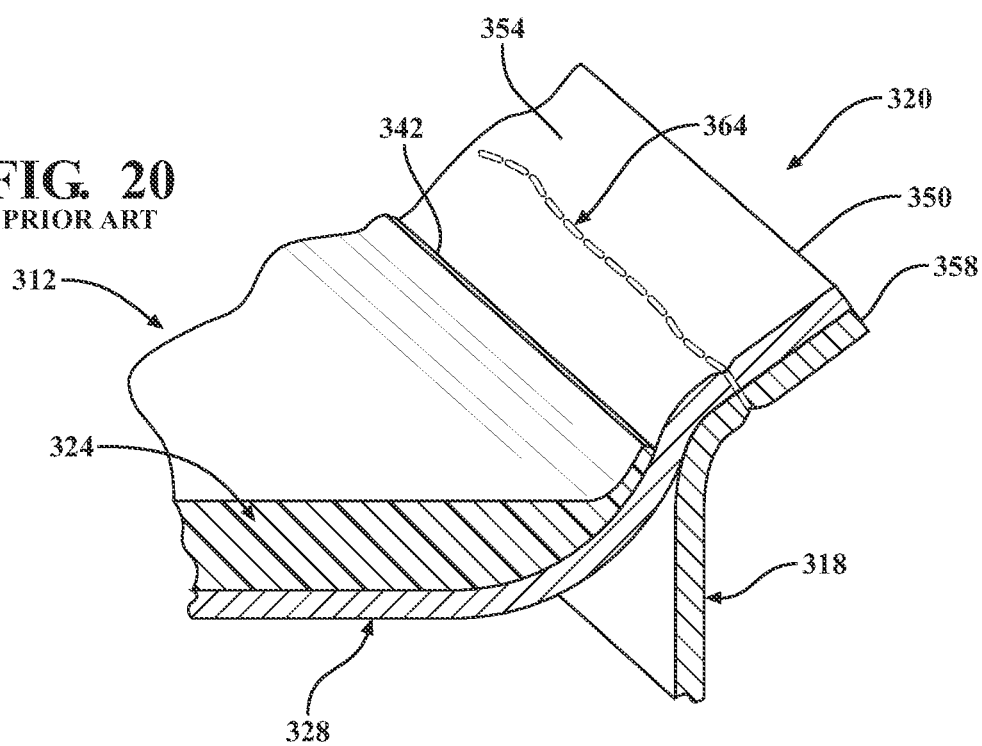
FIG. 20 illustrates a known trim cover assembly having a sew seam through a selvage of a known trim cover and a second component.

FIGS. 20 through 23 illustrate a known sewing process of joining a known trim cover 312 with a second component 318 to form a known trim cover assembly 320. Referring to FIG. 20, the known trim cover 312 comprises a foam backing 324 formed on a cover material 328. The foam backing 324 has an outer edge 342 spaced apart from an outer edge 350 of the known trim cover 312 to form a foam-free selvage 354.

Figure 21:
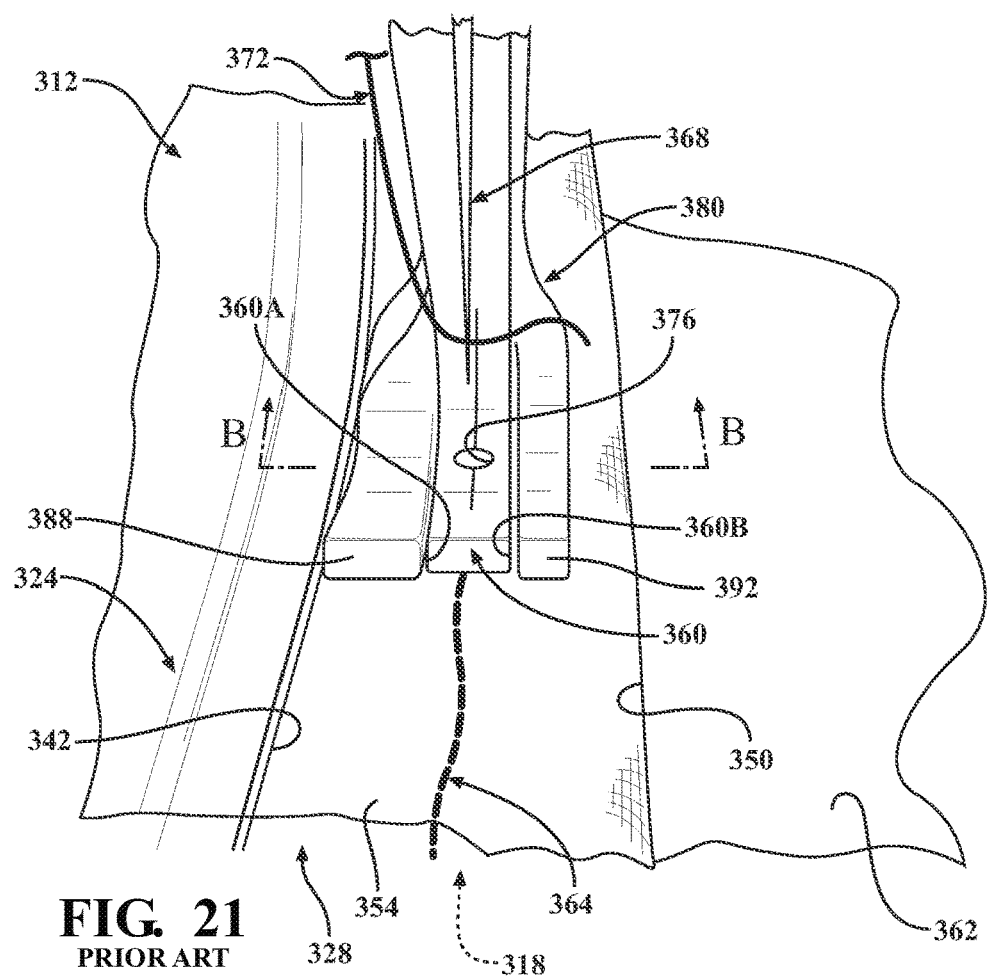
FIG. 21 illustrates a known sewing process of forming a sew seam through the selvage of the known trim cover of FIG. 20.

Typically, an outer edge 358 of the second component 318 is aligned with the outer edge 350 of the known trim cover 312, the pair of the known trim cover 312 and the second component 318 are fed between a sewing foot 360 and a supporting surface 362, and a sew seam 364 is formed through the foam-free selvage 354 and the second component 318, as illustrated in FIG. 21. As is typically known in the art, a sew seam 364 is formed through the known trim cover 312 and the second component 318 using a sewing needle 368 and thread 372. A portion of the sewing needle 368 is passed through a passageway 376 in the sewing foot 360 and pierces the known trim cover 312 and the second component 318 to form the sew seam 364 through generally known methods. The sewing foot 360 includes a guide foot 380 having a first guide portion 388 and a second guide portion 392 positioned near opposing sides 360A, 360B of the sewing foot 360. During the sewing process, the known trim cover 312 and the second component 318 are passed between the sewing foot 360 and the supporting surface 362 and the sew seam 364 is formed in the foam-free selvage 354. The weight and stiffness of the foam backing 324 applies tension on the foam-free selvage 354 such that it is difficult to sew a sew seam 364 spaced a specific and constant distance from the outer edge 350 of the known trim cover 312.

Figure 22:
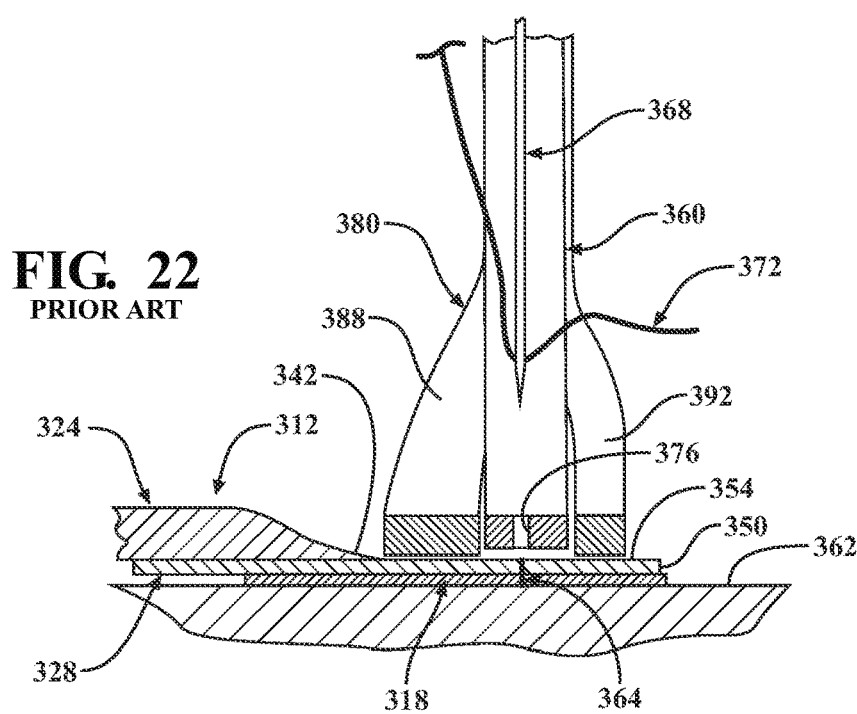
FIG. 22 shows a cross-sectional view of the known sewing process shown in FIG. 21 taken along section line B-B.

A cross-sectional view taken along section line B-B of the known sewing process of FIG. 21 is shown in FIG. 22 further illustrating the known sewing process. Since the known trim cover 312 lacks sewing alignment features S1, S2, S3, the sewing foot 360 can be freely positioned anywhere across the foam-free selvage 354. The stiffness and weight of the foam backing 324 tends to pull the known trim cover 312 away from the sewing foot 360, resulting in sew seams 364 having a poor appearance.

Figure 23:
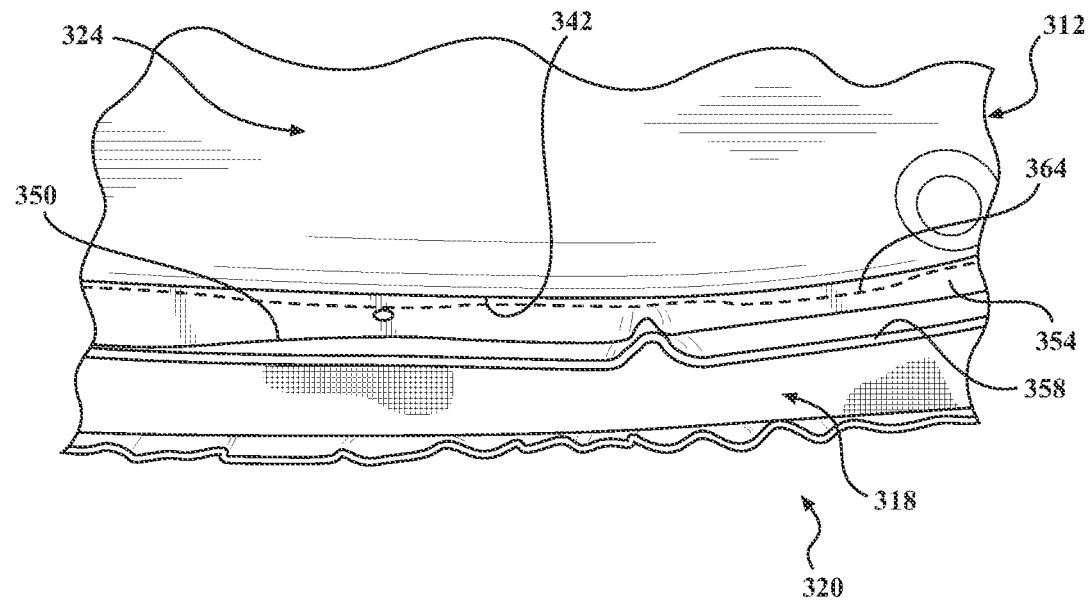
FIG. 23 shows an enlarged perspective view of the portion of the known trim cover assembly of FIG. 22, illustrating the sew seam formed through the selvage of the known trim cover.

A perspective view of a portion of the known trim cover assembly 320 formed by joining the known trim cover 312 and a second component 318 is shown in FIG. 23. Referring to FIG. 23, the sew seam 364 extends along the foam-free selvage 354 of the known trim cover 312. However, since the known trim cover 312 lacks sewing alignment features S1, S2, S3, the sew seam 364 follows an irregular path with uneven spacing between the sew seam 364 and the outer edges 342, 350 of the foam backing 324 and the known trim cover 312.

Figure 24:
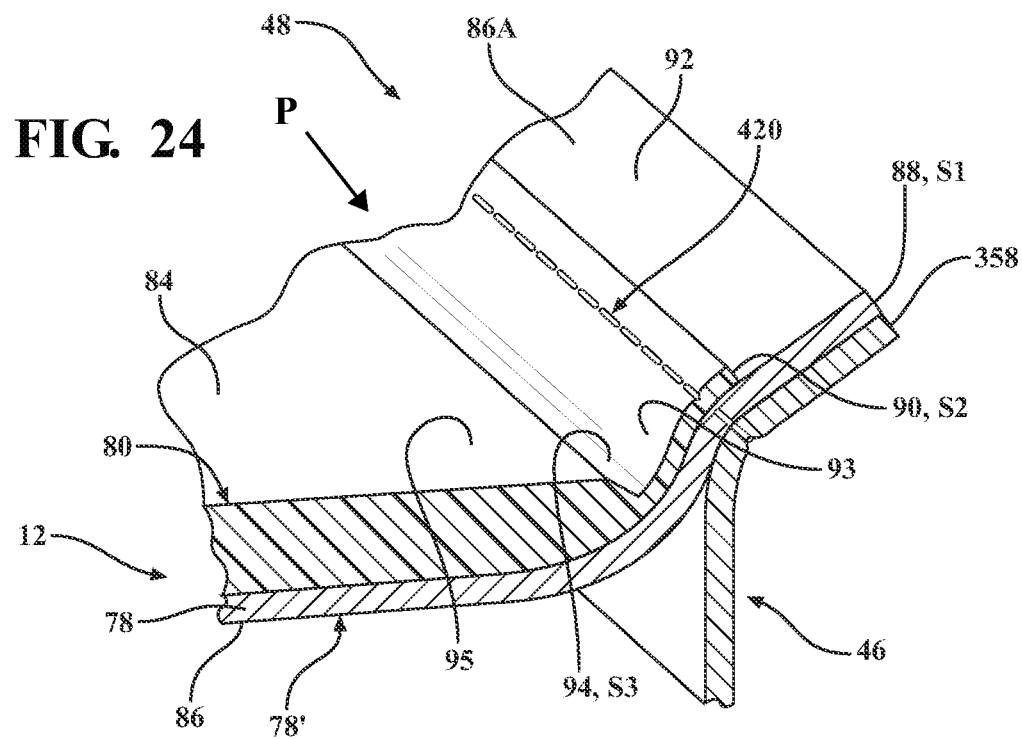
FIG. 24 shows an enlarged fragmentary view of a sew seam joining the molded trim cover of FIG. 18 and a second component, illustrating multiple sewing alignment features according to one embodiment of the present invention.
Figure 25:
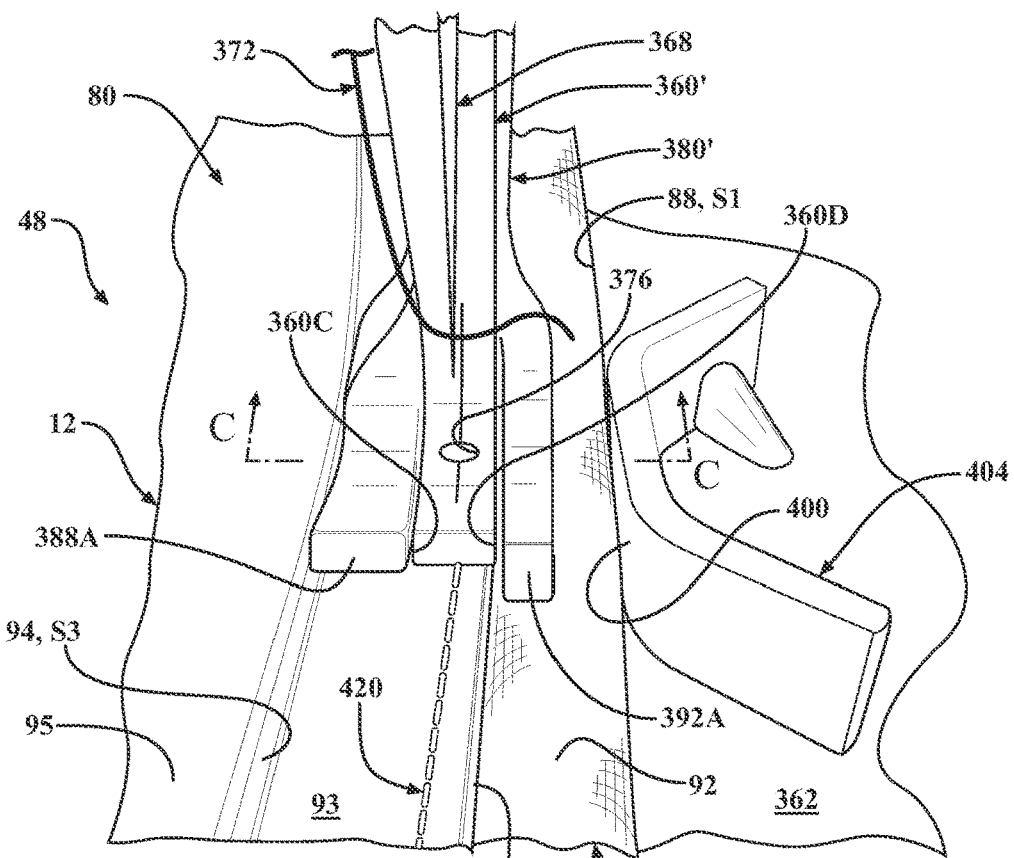
FIG. 25 illustrates a sewing process using multiple sewing alignment features when forming the sew seam joining the molded trim cover of FIG. 18 and the second component, according to one embodiment of the present invention.
Figure 26:
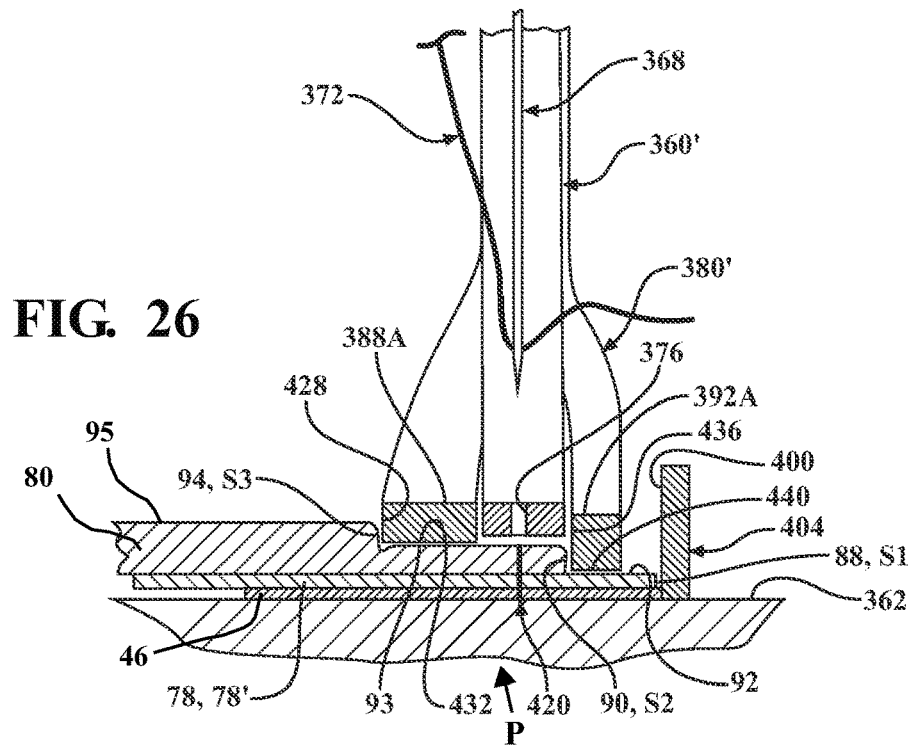
FIG. 26 shows a cross-sectional view of the sewing process of FIG. 25 taken along section line C-C, illustrating the multiple sewing alignment features.

FIGS. 24 through 27 illustrate an improved sewing process joining a trim cover 12 with a second component 46 to form a seat trim cover assembly 48, according to one embodiment of the present invention. Referring to FIG. 24, the seat trim cover assembly 48 comprises a trim cover 12 joined to a second component 46 with a sew seam 420. The trim cover 12 comprises a molded foam backing 80 formed on a cover material blank 78' that has been vacuum-formed into a desired 3-dimensional shape. The molded foam backing 80 includes a stepped edge profile P comprising an end surface 90 projecting at an angle from the back surface 86A of the cover material blank 78', a second surface 93 projecting at an angle from the end surface 90, a third surface 94 projecting at an angle from the second surface 93, and a fourth surface 95 projecting at an angle from the third surface 94. The third surface 94 is oriented in a similar direction as the end surface 90 with the second surface 93 forming a step between the end surface 90 and the third surface 94. The end surface 90 of the molded foam backing 80 is spaced apart from the outer periphery 88 of the cover material blank 78' to form a foam-free selvage 92. The outer periphery 88 of the trim cover 12 defines a first sewing alignment feature S1. The molded foam backing 80 includes a second sewing alignment feature S2 corresponding to the end surface 90 of the molded foam backing 80 and a third sewing alignment feature S3 corresponding to the third surface 94 of the foam backing 80. As is illustrated in FIGS. 25 and 26, the surfaces 90, 93, 94, 95 are sized and shaped to matingly engage with a predetermined guide foot 380' such that end surface 90 and the third surface 94 define sewing alignment features S2, S3, respectively, for guiding the guide foot 380' along the trim cover 12.

Prior to forming a sew seam 420 through the trim cover 12 and the second component 46, the outer edge 358 of the second component 46 is aligned with the outer periphery 88 of the trim cover 12, as illustrated in FIG. 24. Next, the pair of the trim cover 12 and the second component 46 is fed between a supporting surface 362 and the predetermined sewing foot 360' and guide foot 380', as shown in FIGS. 25 and 26. The outer periphery 88 of the trim cover 12 acts as the first sewing alignment feature S1 when the outer periphery 88 is aligned with a guide surface 400 of a sewing machine fence 404 that projects perpendicularly away from the supporting surface 362 a predefined distance from the sewing needle 368.

Referring to FIG. 25, the guide foot 380' comprises a first guide portion 388A and a second guide portion 392A positioned near opposing sides 360C, 360D of the sewing foot 360'. A cross-sectional view taken along section line C-C of the sewing process of FIG. 25 is shown in FIG. 26 further illustrating the details of the pre-determined guide foot 380' and the sewing alignment features S1, S2, S3 of the trim cover 12. The first guide portion 388A includes a first wall 428 extending at an angle from a lower surface 432 of the first guide portion 388A. In the embodiment illustrated in FIG. 26, the first wall 428 is generally perpendicular to the lower surface 432. The shape and dimensions of the first wall 428 and the lower surface 432 of the first guide portion 388A can vary in different embodiments. However, the lower surface 432 and the first wall 428 are configured to matingly engage with portions of the second and third surfaces 93 and 94, respectively, in the molded foam backing 80. Thus, the third surface 94 defines a sewing alignment feature S3 for the first guide portion 388A of the guide foot 380'. Similarly, the second guide portion 392A includes a second wall 436 configured to matingly engage with a portion of the end surface 90 of the molded foam backing 80 such that the end surface 90 defines a sewing guide feature S2 for the second guide portion 392A of the guide foot 380'. Likewise, the second guide portion 392A includes a lower surface 440 configured to matingly engage with the foam-free selvage 92. Preferably, the horizontal distance between the first wall 428 of the first guide portion 388A and the second wall 436 of the second guide portion 392A is selected to be approximately the horizontal distance between the third surface 94 and the end surface 90 of the molded foam backing 80.

As illustrated in FIG. 26, the lower surface 440 of the second guide portion 392A and the lower surface 432 of the first guide portion 388A of the guide foot 380' are offset by a vertical distance approximately equal to the vertical distance between the foam-free selvage 92 and second surface 93 of the molded foam backing 80. As such, the guide foot 380' and the stepped sewing guide features S2, S3 integrated into the molded foam backing 80 are configured such that the guide foot 380' matingly engages with the stepped sewing guide features S2, S3. Other embodiments of the sewing alignment features S1, S2, S3 may include tapered and/or curved surfaces to provide sufficient alignment for the guide foot 380' as long as a portion of the third surface 94 is configured to matingly engage with a portion of the first wall 428 of the first guide portion 388A and as long as a portion of the end surface 90 is configured to matingly engage with a portion of the second wall 436 of the second guide portion 392A. As such, the dimensions and surface contours of the sewing alignment features S1, S2, S3 are pre-selected based on a pre-determined guide foot 380' and a predefined distance between the sewing needle 368 and the guide surface 400 of the sewing machine fence 404.

Referring to FIG. 26, specific shape and dimensions of the sewing alignment features S1, S2, S3 are selected such that the guide surface 400 of the sewing machine fence 404 abuts the outer periphery 88 of the cover material 78 (i.e., the first sewing alignment feature S1) and the guide foot 380' has a second wall 436 that matingly engages with the second sewing alignment feature S2 and a first wall 428 that matingly engages with the third sewing alignment feature S3. Since the second surface 93 of the molded foam backing 80 extends across the width of first guide portion 388A of the guide foot 380' and extends across the width of the sewing foot 360', the downward pressure applied by the guide foot 380' and the sewing foot 360' help stabilize the position of the molded foam backing 80. Further, a portion of the molded foam backing 80 is encased within the sew seam 420 since a portion of the end surface 90 of the molded foam backing 80 abuts the second guide portion 392A of the guide foot 380'.

While a portion of the molded foam backing 80 is encased in the sew seam 420, the molded foam backing 80 preferably does not extend across the foam-free selvage 92, as illustrated in FIG. 26. The foam-free selvage 92 provides a glide surface for the second guide portion 392A of the guide foot 380'. Preferably the molded foam backing 80 does not extend to the outer periphery 88 of the trim cover 12 since the lack of molded foam backing 80 under the second guide portion 392A increases the flexibility of foam-free selvage 92 of the trim cover 12. The lack of molded foam backing 80 in the foam-free selvage 92 minimizes the thickness of the sew seam 420 since the end surface 90 of the molded foam backing 80 is spaced between the sew seam 420 and the outer periphery 88 of the trim cover 12, minimizing the amount of molded foam backing 80 between the sew seam 420 and the outer periphery 88 while still encasing a portion of the molded foam backing 80 within the sew seam 420.

Figure 27:
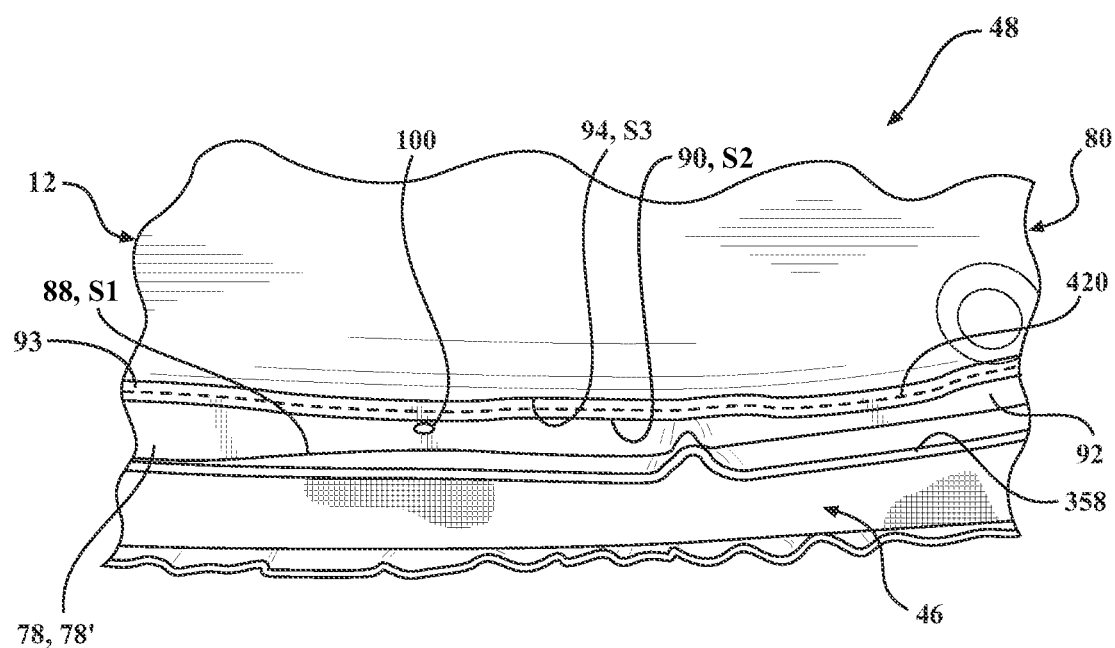
FIG. 27 shows an enlarged perspective view of the portion of a trim cover assembly of FIG. 26, illustrating the sew seam formed though the molded foam backing of the trim cover, illustrating the sew seam spaced apart from the multiple sewing alignment features.

A perspective view of a portion of the seat trim cover assembly 48 of FIG. 26 is shown in FIG. 27, illustrating the sew seam 420 joining the trim cover 12 and the second component 46. The sew seam 420 extends along the second surface 93 of the molded foam backing 80 and is evenly spaced between the third surface 94 defining the third sewing alignment feature S3 and the end surface 90 defining the second alignment feature S2. Further, the sew seam 420 is generally uniformly spaced apart from the outer periphery 88 of the cover material 78. The bulk of the material is minimized between the sew seam 420 and the outer periphery 88 of the cover material 78 and the outer edge 358 of the second component 46 while still encasing a portion of the molded foam backing 80 within the sew seam 420. Thus, the sewing alignment features S1, S2, S3 forming the stepped edge profile P of the molded foam backing 80 in combination with the foam-free selvage 92 result in an improved appearance of the sew seam 420.

The disclosed trim covers and other components manufactured using the disclosed processes have many benefits over other known methods of manufacturing trim covers. One benefit is these trim covers have a 3-dimensional shape and an integrated foam backing. A second benefit is the trim covers have a selvage extending around the outer perimeter that is less stiff and has less material within a sew seam than a trim cover having compressed foam extending to the edge of the trim cover. A third benefit is a portion of the foam backing is included within the sew seam. A fourth benefit is an improvement in the appearance of the sew seam. A fifth benefit is a reduction in errors when sewing a sew seam since the foam backing includes a stepped edge profile having multiple sewing alignment features.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat trim cover for a vehicle seat, comprising:
a cover material blank comprising at least a cover material, said cover material blank pre-cut into a predefined shape having a predefined selvage extending around an outer periphery of said cover material blank;
wherein said cover material blank is vacuum formed into a 3-dimensional shape; and
wherein a molded foam backing is formed on said cover material blank after said cover material blank is vacuum formed into said 3-dimensional shape, said molded foam backing being spaced apart from said predefined selvage extending around said outer periphery of said cover material blank forming a foam-free selvage, said molded foam backing including a stepped edge profile comprising a first surface defining a first sewing alignment feature and a second surface defining a second sewing alignment feature, said first sewing alignment feature being spaced apart from said second sewing alignment feature.

2. The seat trim cover as set forth in claim 1, wherein said stepped edge profile comprises said first surface projecting at an angle from said cover material blank, a third surface extending between said first surface and said second surface such that said first, second, and third surfaces form said stepped edge profile.

3. The seat trim cover as set forth in claim 2, wherein said cover material comprises one or more of vinyl, fabric, and/or leather.

4. The seat trim cover as set forth in claim 3, wherein said predefined selvage includes a plurality of locating features configured to fixedly position at least a portion of said outer periphery of said cover material blank while said cover material blank is vacuum formed into said 3-dimensional shape.

5. The seat trim cover as set forth in claim 4, wherein each of said plurality of locating features is a locating hole passing through said predefined selvage of said cover material blank.

6. The seat trim cover as set forth in claim 5, wherein:
said cover material blank includes a front surface and an opposing rear surface, said front surface of said cover material blank forms an A-surface of said seat trim cover; and
said A-surface has at least one vacuum formed feature having an appearance of a sew seam.

7. The seat trim cover as set forth in claim 6, wherein said A-surface has at least one vacuum formed feature having a curved surface profile.

8. The seat trim cover as set forth in claim 7, wherein said A-surface has at least one vacuum formed feature having an embossed appearance.

9. The seat trim cover as set forth in claim 5, wherein said seat trim cover is one of a seat cushion trim cover, a seat back trim cover, and/or a seat back panel.

10. The seat trim cover as set forth in claim 5, wherein at least one or more of a seat heater, a sensor, an electrical circuit, a fastener, a scrim backing layer, and/or a foam lining is assembled as part of said cover material blank prior to vacuum forming said cover material blank.

11. The seat trim cover as set forth in claim 5, wherein:
said cover material blank comprises a second material assembled with said cover material forming a pocket between said second material and said cover material; and
said second material being one or more of vinyl, fabric, and/or leather.

12. The seat trim cover as set forth in claim 11, wherein:
said second material forming said pocket extends from one edge of said cover material to an opposing edge of said cover material; and
said second material fixedly coupled to said cover material.

13. The seat trim cover as set forth in claim 5, wherein said cover material blank comprises a first cover piece having a first edge and a second cover piece having a second edge, at least a portion of said first edge of said first cover piece being joined by a sew seam to at least a portion of said second edge of said second cover piece prior to said cover material blank being vacuum-formed into said 3-dimensional shape.

14. The seat trim cover as set forth in claim 13, wherein at least a portion of said first edge of said first cover piece and at least a portion of said second edge of said second cover piece are encased within said molded foam backing when said molded foam backing is formed on said vacuum-formed cover material blank.

15. The seat trim cover as set forth in claim 14, wherein:
said cover material blank comprising a third cover piece having a third edge;
said third cover piece being assembled with said first and second cover pieces to form a pocket between said third cover piece and said first cover piece; and
at least a portion of said third edge adjoined with at least a portion of said first and second edges within said sew seam between said first cover piece and said second cover piece.

16. The seat trim cover as set forth in claim 5, wherein said molded foam backing is formed of at least a blended polyol and an isocyanate.

17. A seat trim cover assembly for a vehicle seat, comprising a trim cover adjoined to a second component by a sew seam, said trim cover comprising:
a cover material blank including at least a cover material pre-cut into a predefined shape having a predefined selvage extending around an outer periphery of said cover material blank wherein said cover material blank is vacuum formed into a 3-dimensional shape; and
a molded foam backing formed on said vacuum-formed cover material blank, said molded foam backing being spaced apart from said predefined selvage extending around said outer periphery of said cover material blank forming a foam-free selvage, said molded foam backing including a stepped edge profile comprising a first surface defining a first sewing alignment feature and a second surface defining a second sewing alignment feature, said first sewing alignment feature being spaced apart from said second sewing alignment feature;
wherein said trim cover is adjoined to said second component by said sew seam formed through said molded foam backing, said cover material blank, and said second component, said sew seam being spaced between said first sewing alignment feature and said second sewing alignment feature.

* * * * *